(12) United States Patent
Pylant

(10) Patent No.: US 10,963,934 B1
(45) Date of Patent: Mar. 30, 2021

(54) SYSTEM AND METHOD FOR EXCHANGING DYNAMICALLY PRICED OFFER DATA BETWEEN A RESTAURANT AND A CONSUMER

(71) Applicant: Pylant IP LLC, Naples, FL (US)

(72) Inventor: Jeffrey Pylant, Naples, FL (US)

( * ) Notice: Subject to any disclaimer, the term of this patent is extended or adjusted under 35 U.S.C. 154(b) by 0 days.

(21) Appl. No.: 15/843,874

(22) Filed: Dec. 15, 2017

Related U.S. Application Data

(60) Provisional application No. 62/435,046, filed on Dec. 15, 2016.

(51) Int. Cl.
 *G06Q 30/06* (2012.01)
 *G06Q 30/02* (2012.01)
 (Continued)

(52) U.S. Cl.
 CPC ....... *G06Q 30/0611* (2013.01); *G06Q 10/109* (2013.01); *G06Q 30/0205* (2013.01);
 (Continued)

(58) Field of Classification Search
 CPC .......... G06Q 30/0613; G06Q 30/0235; G06Q 30/0205; G06Q 30/0611; G06Q 30/0619;
 (Continued)

(56) References Cited

U.S. PATENT DOCUMENTS

| | | | |
|---|---|---|---|
| 2011/0313840 A1* | 12/2011 | Mason | G06Q 30/0235 705/14.35 |
| 2012/0116828 A1* | 5/2012 | Shannon | G06Q 10/0631 705/7.12 |
| 2017/0256015 A1* | 9/2017 | Moecklin | G01S 19/46 |

OTHER PUBLICATIONS

Article, "You can order meal via Facebook now You can order meal via facebook now", published in . (Oct. 20, 2016) in TradeArabia published by SyndiGate Media inc in Manama, US; extracted from Dialog on Nov. 10, 2020.*

* cited by examiner

*Primary Examiner* — Yogesh C Garg
(74) *Attorney, Agent, or Firm* — Kurtz Firm, PLLC

(57) ABSTRACT

A computer-implemented system and method are disclosed for facilitating dynamically-priced offer data between a restaurant and a consumer, the data reflecting dynamically-priced offers which are contingent upon the consumer first honoring in full their contractual promises to the restaurant before the restaurant is bound to honor its 'side' of the deal. In an embodiment, the method and system enables a consumer to specify, in advance, a minimum amount of money the consumer contractually binds themselves to spend at a restaurant as well as the specific hour of the day of a specific day of the week of a specific week of the year the consumer promises to arrive at the restaurant or expects delivery of an order from a restaurant, in return for more of the goods or services the restaurant contractually, but contingently binds themselves to provide the consumer. Further disclosed is a system and method for dealing with instances where a consumer fails to meet their contractual obligation to the restaurant, upon which assurances the restaurant's bid was contingent. In an embodiment, a controller is provided for an authorized restaurant representative to use to access a data storage device in which is stored restaurant 'deal' offers which may be triggered by consumer's Request For Bid (RFB). The same controller receives those RFB's from consumer and accesses the same data storage device as it attempts to present responsive bids from local area restaurants.

23 Claims, 21 Drawing Sheets

(51) Int. Cl.
*G06Q 10/10* (2012.01)
*G01S 19/42* (2010.01)
*G06Q 30/04* (2012.01)
*G06Q 30/08* (2012.01)
*G06F 16/23* (2019.01)
*G06F 16/25* (2019.01)
*H04W 4/021* (2018.01)
*H04W 4/23* (2018.01)

(52) U.S. Cl.
CPC ..... *G06Q 30/0235* (2013.01); *G06Q 30/0613* (2013.01); *G06Q 30/0619* (2013.01); *G06Q 30/0635* (2013.01); *G01S 19/42* (2013.01); *G06F 16/2365* (2019.01); *G06F 16/258* (2019.01); *G06Q 30/0213* (2013.01); *G06Q 30/0236* (2013.01); *G06Q 30/04* (2013.01); *G06Q 30/0605* (2013.01); *G06Q 30/08* (2013.01); *H04W 4/021* (2013.01); *H04W 4/23* (2018.02)

(58) Field of Classification Search
CPC ............... G06Q 30/08; G06Q 30/0236; G06Q 30/0213; G06Q 30/0605; G06Q 30/04; G06Q 10/109; H04W 4/021; H04W 4/23; G01S 19/42; G06F 16/258; G06F 16/2365
USPC .... 705/26.41, 26.1, 26.44, 26.4, 26.3, 26.81
See application file for complete search history.

RFB elements

Deal Ticket Elements

| | | | | |
|---|---|---|---|---|
| 800 → | Unique Ticket ID | | 123 ABC 987 | |
| 801 → | Consumer ID# | Restaurant ID# ← 802 | C-123456 | R-987654 |
| 803 → | Day of Year Deal Execution Promised | Meal Venue ← 804 | 11/25/2020 Wednesday | Delivery |
| 805 → | Promised Hour of Execution | Restaurant's Bonus Bid % ← 806 | 4:00 – 5:00PM | 100% |
| 807 → | Customer Minimal Guarantee | Bonus Bid % Expressed as Dollars ← 808 | $25.00 | $25.00 |
| | Deal Value before Delivery Charge ← 809 | | $50.00 | |
| | Delivery Charge (if applicable) ← 810 | | – $5.00 | |
| | TOTAL DEAL VALUE ← 811 | | $45.00 | |

FIG 8

DayPart Element

RFB 'Bonus Bid' Element

RFB Arrival Time Element

Display Deal Details in Restaurant Dashboard
(POST-validation)

| 800 Ticket ID# | 200 Consumer promises to spend at least: | 203 Venue | 806 Your restaurant promised a Menu Bonus of: | 808 Equal to an additional | 809 For a TOTAL Deal of |
|---|---|---|---|---|---|
| 123ABC789 | $25.00 | CARRY-OUT | 100% | $25.00 | $50.00 |

| 1700 On time arrival? | 201 Customer Promised to Arrive | 513 Customer Arrived |
|---|---|---|
| YES! | 4:00 – 5:00PM 02/05/2017 | 4:23 PM 02/05/2017 |

FIG 16

Bids from 3 restaurants

| Restaurant Name | Customer Guarantee | Arrival Time | Venue | Menu Bonus | Menu Bonus = | TOTAL deal Value |
|---|---|---|---|---|---|---|
| Mr. Rudy's Ribs | $40.00 | 7:00-8:00PM | Eat IN | 30% | $12.00 | $52.00 |
| Pam's Pizza | $40.00 | 7:00-8:00PM | Eat IN | 20% | $8.00 | $48.00 |
| Davey's Dogs | $40.00 | 7:00-8:00PM | Eat IN | 10% | $4.00 | $44.00 |

FIG 20

Restaurant Disputes an Invoice

SYSTEM AND METHOD FOR EXCHANGING DYNAMICALLY PRICED OFFER DATA BETWEEN A RESTAURANT AND A CONSUMER

This application is a non-provisional of, and claims priority to, U.S. Provisional Patent Application No. 62/435,046 filed 15 Dec. 2016, the entire disclosure of which is incorporated herein by reference.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present invention relates in general to the field of to electronic contract applications using electronic information networks, and in particular to a system for electronic data exchange which uses the Internet or conventional telephony to facilitate requests for bids (RFB) from prospective restaurant customers which become binding upon restaurants when the prospective restaurant customer honors, in full, their conditional promises to restaurant.

BACKGROUND

How much, when, and where—that is: whether the 'venue' will be eat in, take out, or delivery? The restaurant industry pivots every minute of every day around the answers to those 3 questions.

Ask any restaurant owner which days and what hours their tables are usually empty and they'll be able to tell you, with excruciating exactness, the hours, days, and restaurant location they suffer from a dearth of restaurant customers. Very few restaurants need customers Saturday night at 7:00 PM. They need customers walking in their restaurant doors Monday's at 4:30 PM, or Thursday's at 10:00 PM, when the food and staff are there, the lights are on and the restaurant's financial overhead is overhead—but there just aren't enough persons in seats at such days and times.

The restaurant industry is an incredibly important part of the U.S. gross domestic product—and wildly inefficient. According to The National Restaurant Association, (http://www.restaurant.org/News-Research/Research/Facts-at-a-Glance) U.S. annual industry sales total just shy of $800 Billion. That's just a little less than $2 Billion that is spent-every-day at U.S. restaurants. The industry employs about 15 million people . . . about 10% of the U.S. workforce. Estimates of the total number of U.S. restaurants vary from 600,000 to 1,000,000. Research firm NPD Group says Americans make more than 61 billion restaurant visits annually, about 167 million restaurant visits daily.

The biggest problem in the restaurant industry is that restaurant seats expire. They "spoil", a little bit, every minute, just like seafood and other restaurant inventory. A restaurant cannot generate revenue this hour from a seat or a table, that was empty last hour. That problem exists whether that restaurant is owned by a restaurant chain, or is a small independent "ma and pa" type restaurant which doesn't have the marketing resources or the digital know-how to compete against the chain restaurants. The only and eternal fight in the restaurant industry is over market share. It's a gunfight to which small local restaurants can only bring a knife.

Domino's Pizza, for example, is said to earn more than $1 billion annually just from the slice of revenue produced by its online platform. CNBC financial commentator Jim Cramer tweeted in 2017: "I think Dominos is a tech company with a fabulous online ordering platform that's merely masquerading as a pizza chain."

The owners of small restaurants typically don't have the technical ability or financial resources to create an online presence that would level the playing field, giving them the same advertising and marketing impact and 'footprint' of the big chain restaurants. That said, even the big chain restaurants are also afflicted by empty tables. A chain restaurant's pain from empty tables is multiplied, almost exponentially, by the number of units comprising the chain. Whether it's 10 or 10,000,000 empty tables an hour, the agony, inefficiencies and economic loss are significant.

What's the solution? It's not Groupon. All restaurant owners needed to do was cut their reasonable and fair prices by 50% . . . then pay Groupon 50% of that amount as its fee. Not surprisingly, that's not a solution many restaurant owners continue to embrace.

U.S. Pat. No. 8,527,395 to Pylant describes a buyer-driven, buyer-executed auction but requires not only the prospective buyer's identity be revealed in advance, but the buyer's financial information as well, before a transaction may be completed. Not only that, the U.S. Pat. No. 8,527,395 patent requires confirmation from a third-party source that the buyer is financially capable of completing the transaction. Each of those three flaws are toxic to the usefulness of the U.S. Pat. No. 8,527,395 system. Worse, the U.S. Pat. No. 8,527,395 system only attempts to perfectly fulfill the user's query. If it can't perfectly execute, the Pylant '395 system provides no contingencies to deal with partial fulfillment of a deal. It's just not an ideal solution.

U.S. Pat. No. 8,341,033 issued to Porat describes a buyer's auction that requires responses from at least two sellers, then communicates information about one of the sellers to another one of the sellers, allowing a seller to adjust their offer then receiving that adjusted offer.

U.S. Pat. No. 8,620,741 to Chen describes a method for reducing excess restaurant capacity that involves customers bidding on gift certificates where the certificate is awarded to the highest bidder. A problem with the described system is Chen's intent to drive up the amount of money the consumer pays for a meal. Another aim of Chen is to force a consumer to provide information about themselves "must register with the website and provide certain identification and demographic information during a registration process before being able to obtain a certificate." It would be desirable to provide a system that does not require obtaining demographic information before a user is able to trigger and accept a restaurant offer.

U.S. Pat. No. 8,326,705 to Niessen describes a method that "sends out offers to targeted consumers based on consumer preferences". Such systems can be annoying to consumers.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

FIG. 8 illustrates the names of the elements which comprise a System-created Ticket and a corresponding sample of those elements.

FIG. 16 illustrates what information the System displays inside the restaurant's private 'dashboard' after a valid Ticket #has been presented for validation.

FIG. 20 demonstrates bids from 3 different restaurants and how the System may display those bids to a prospective restaurant customer.

DETAILED DESCRIPTION

Figure 1:
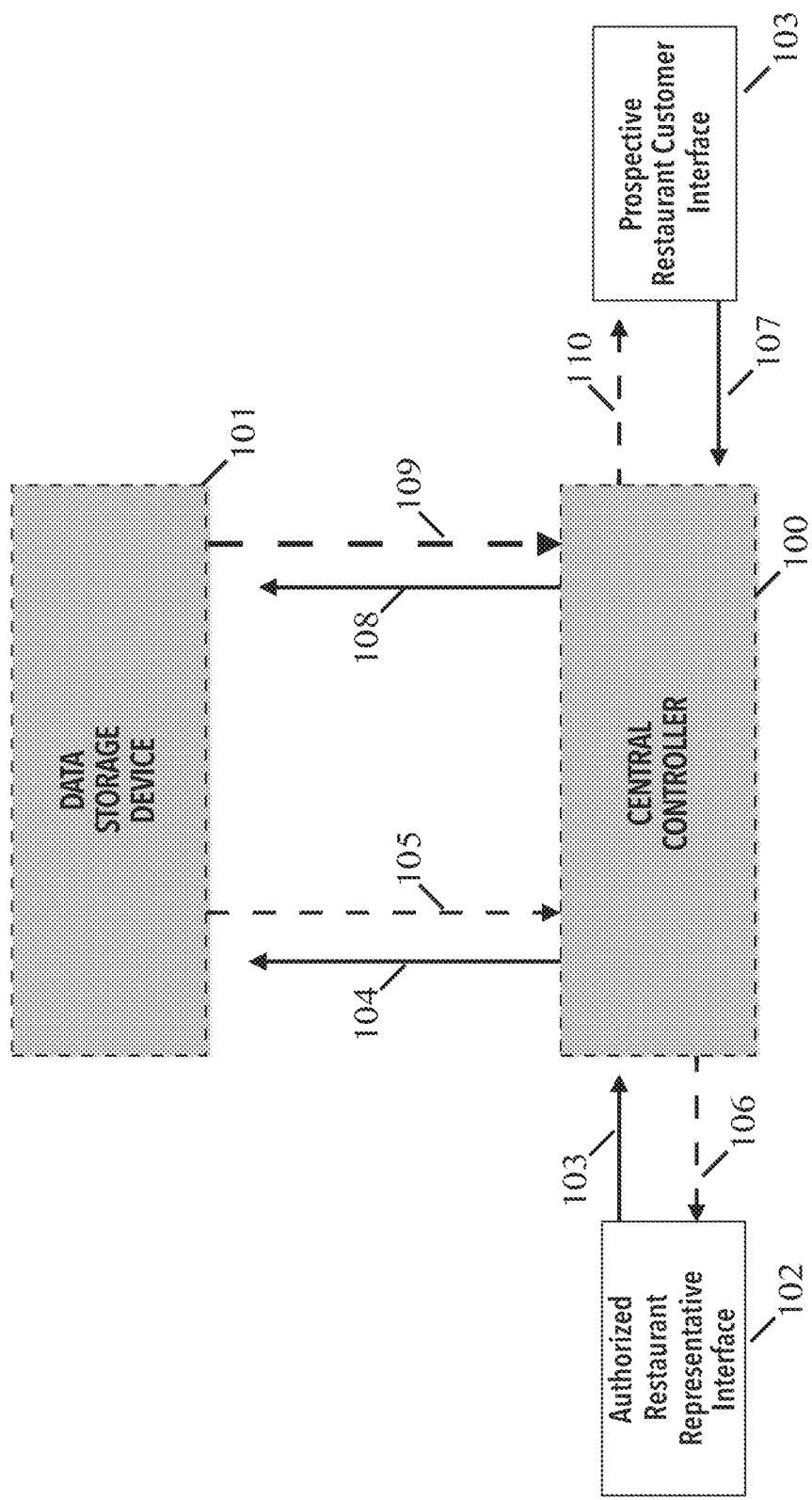
FIG. 1 shows a block diagram illustrating the architecture of the invention in its preferred embodiment.

Reference will now be made in detail to the preferred embodiments of the present invention, examples of which are illustrated in the accompanying drawings. The following description and drawings are illustrative and are not to be construed as limiting. Numerous specific details are described to provide a thorough understanding. However, in certain instances, well-known or conventional details are not described in order to avoid obscuring the description.

Reference in this specification to "an embodiment" or "the embodiment" means that a particular feature, structure, or characteristic described in connection with the embodiment is included in at least an embodiment of the disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present invention is described below with reference to block diagrams and operational illustrations of methods and devices to provide offer exchanges between restaurants and consumers. It is understood that each block of the block diagrams or operational illustrations, and combinations of blocks in the block diagrams or operational illustrations, may be implemented by means of analog or digital hardware and computer program instructions. These computer program instructions may be stored on computer-readable media and provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

In an embodiment, the invention provides a system and method that creates a digital platform where local restaurants are able to offer dynamically-priced deals on the specific days and the specific hours they choose. Those dynamically-priced deals will depend not only on how much money a customer guarantees they will first spend, minimally, before the restaurant will be required to honor its 'end' of the deal—but also—secondly on the days and times the restaurant owner chooses to allow deals to be 'active' on the system. Lastly, the restaurant owner is able to set the 'floor', the minimum amount of money a consumer must first offer to spend before it triggers the system to display an offer from that restaurant. Given those criteria and deployed in this manner, dynamically-priced deals level the playing field in the restaurant industry. Now, 'Ma and Pa Pizza' can compete toe-to-toe and cheese-to-cheese with Dominos.

How much, when, and where—that is: whether the 'venue' will be eat in, take out, or delivery? The restaurant industry pivots every minute of every day around the answers to those three questions. What restaurant owners, both large and small, need is a method and system to provide individual, on-demand, specific, time-sensitive answers to those three criteria. the solution is to present dynamically-priced offers to consumers; offers that are contingent upon (1) how much money the consumer is willing to spend, (2) when, and (3) where, meaning at what 'venue'; at the restaurant, carry-out or via delivery? Consumers need the same thing; a system and method that enables them to elicit dynamically-priced offers from nearby restaurants; offers which are dependent upon and responsive to the amount of money the consumer is willing to spend, and the time of the day, and the day of the week and the week of the year that a consumer is willing arrive at the restaurant, and whether the consumer is expecting to 'eat-in', to 'carry-out or receive delivery of their subsequent order. The restaurant industry's problem of expiring inventory and many other pressing problems will be solved by the system that is able to ask and then provide answers to those 3 questions.

A computer-implemented methodology, system and business model are disclosed for facilitating dynamically priced offers between a restaurant and a consumer, dynamically priced offers which are contingent upon the consumer first honoring, in full, their contractual promises to the restaurant before the restaurant is bound to honor its 'side' of the deal. In a preferred embodiment, the method and system enables a consumer to specify, in advance, the minimal amount of money the consumer contractually binds themselves to spend as well as the specific time of day of a specific day of the week of a specific week of the year the consumer promises to arrive at the restaurant, in return for more of the goods or services the restaurant contractually, but contingently binds themselves to provide the consumer.

Further disclosed is a system and method for dealing with instances when the consumer fails to fulfill those precise contractual obligations, providing a system for offering the consumer a 'default' deal from the restaurant; an offer which the consumer may still find attractive, but which may not be quite as rewarding as the initial deal the consumer failed to honor.

In an embodiment, the present invention includes a controller that an authorized restaurant representative may use to access a data storage device in which is stored restaurant 'deal' offers that may be triggered by consumer's Request For Bid (RFB). The same controller receives those RFBs from consumer and accesses the same data storage device as it attempts to present responsive bids from local area restaurants.

In an embodiment, the invention provides a computer apparatus having one or more hardware processors and computer memory storing computer program code executed in the one or more hardware processors to conduct electronic commerce transactions between restaurants and restaurant customers. The computer apparatus may include a first controller which allows a restaurant customer to specify, via a network, the time of the day the customer will arrive and the minimum amount of money the customer will spend. The apparatus may include a second controller that allows restaurants to respond, via a network, with dynamically priced offers to which the restaurants would agree to be bound contingent upon the restaurant customer first fulfilling, completely, the obligations to which the customer agrees. The offer includes a 'default deal' offer to which both parties will be bound if the restaurant customer fails to completely fulfill any element of their side of the deal. The first controller and said second controller may comprise at least one particular machine, said at least one particular machine comprising at least one physical computing device.

A consumer is able to create a request for bid (RFB) which then triggers a System search of one or more of its databases to find any possible responsive matches from participating restaurants. the system is able to do so simply by inputting into the present invention's rules-based bid generator three simple criteria: 1. the amount of money the consumer contractually guarantees to spend, at a minimum, at a restaurant, and 2. the hour the consumer contractually guarantees to arrive at the restaurant to: 3. 'eat-in', carry-out or receive delivery of their order. The system contemporaneously gathers present or future location information such as GPS data, Google location data, IOS location data, Google Maps location data, zip code data, or other known location-identifying data, from the consumer's electronic device. The system may receive or compute the latitude and longitude of the device to pinpoint the geographic location of the user, then include that geo-data to enhance the user's RFB in order to seek within its System, and if it so finds, then trigger, relevant restaurant bids. The system may be configured to use the location data from the prospective customer's device to identify potential offers by using System rules to compute a geo-fence around the prospective customer's current or future location.

If there are 'responsive' bids from local restaurants matching the terms of a consumer's RFB, those bids are automatically triggered by the System's rules-based bid generator and then displayed to the consumer.

In an embodiment, the presently disclosed system and method takes a unique approach by allowing restaurants to create rule-based dynamically-responsive offers where the consumer is offered a menu "bonus credit", which is expressed as a percentage of whatever amount of money the consumer guarantees to first spend, minimally, before the that menu bonus credit is due the consumer.

For example, assume it's Wednesday 5:30 P.M. and the owner or an authorized representative (management) of Restaurant 'A'—days earlier—knowing that Wednesday evenings are usually always slow at his restaurant, had input into the System an offer where the restaurant would give a bonus of 50% off their menu prices, valid Wednesday, between 5:00 PM and 9:00 PM—as long as the consumer agreed to spend at least $15.00. And it would not matter whether the consumer wanted to 'eat-in', or 'carry-out'. Now, assume a consumer creates a RFB offering to spend $20.00, chooses to be seated, that is, 'eat-in' and promises to arrive between 6:00 PM and 6:30 PM. That RFB criteria is sufficient to trigger the System to display Restaurant "A's" offer that had been input (days earlier) into the System. All conditions were met: the RFB specified the right day (Wednesday), the right time (between 5:00 PM and 9:00 PM), the right money (more than $15.00) and the right venue (eat in). Further assume the consumer sees and accepts the offer from Restaurant 'A'. The System then creates a Deal Ticket guaranteeing the consumer will receive from Restaurant 'A' a 'menu credit' of $10.00 (50% of the $20.00 the consumer stipulated he would spend, minimally) for a TOTAL deal value of $30.00 ($20+$10). The consumer will pay the restaurant $20.00 but receive $30.00 worth of goods and services found on the restaurant's menu. Of course, the consumer is still liable to the restaurant for any amount they spend greater than $30.00. (This consumer 'overage' or 'breakage' is highly desirable by restaurants).

In an embodiment, a mandatory step during the restaurant registration process requires the owner or representative of the restaurant to create and agree to honor a 'default' deal which will only be triggered when a consumer fails to honor all the elements of a deal. That default deal percentage bonus is created simultaneously with and incorporated into the original deal terms of every RFB. The system can automatically declare as 'invalid' every Ticket when the consumer arrives earlier or later than the window of time to which the consumer had originally obligated themselves in their initial RFB—or on the wrong day—or at the wrong restaurant location. Both the consumer and restaurant are notified of the validation failure at which time the validation failure is recorded in both the restaurant and consumer deal databases and the system automatically displays the restaurant's 'default' offer. It is solely at the consumer's discretion whether to accept the default offer displayed when a Ticket is declared 'invalid' by the system.

In an embodiment, restaurant owners or their representatives who register their restaurants with the system are provided a private, password-protected System dashboard that consists, among other elements, of a 7-day week calendar where each day of the week is broken down into restaurant hours (called "day parts") corresponding to breakfast, late-morning, lunch, late-afternoon, dinner, and late-night/very-early-morning restaurant hours. A restaurant owner will be not required to create offers for every day part of every day of the week. The system dashboard comprises offer data fields for receiving contract terms, either by selection or by data entry. In an embodiment, the system dashboard may include an offer data field allowing the restaurant owner or representative to specify that the offer includes a term requiring that the prospective restaurant customer include a particular menu selection in the customer's order.

Another advantage of the presently disclosed system is that restaurant owners may choose not only the time of the day, the day of the week, and the week of the year—but also the monetary-value 'floor' before a deal is triggered. For example, a restaurant owner might be willing to accept a minimum consumer offer of $20.00 if the consumer promises to arrive between 7:00 pm-7:30 pm on a Tuesday night, but on Saturday nights, that same restaurant operator might wish to require a minimum consumer offer of $40.00 before that restaurant's responsive offer would be triggered for a consumer's promise to arrive during that same window of time. thus, the disclosed system gives a restaurant owner the power to control the offers that the System will display based on the "Big 3" questions around which the restaurant industry pivots: 1. how much, 2. when and 3. where. No other system gives restaurant owners such granular control.

In an embodiment, the disclosed system produces buyer-driven, buyer-executed, dynamically-priced, location-specific, mutually created, contractually-guaranteed restaurant deals on-demand; deals that further provide a method for displaying a default offer if a consumer does not arrive 1. within a window of time of day on the correct day or 2. at the correct restaurant location "named" when the system initially created the ticket number, or 3. whether the consumer decides they'd like to receive delivery of their order, instead 'carry-out'.

When creating or modifying a restaurant offer inside their password-protected dashboard, the disclosed system can require restaurant owners to choose, in this order: 1. the specific day of week (which the System will understand corresponds to a specific day of the year (for example Aug. 3, 2020 will be the 216th day of the year in the Gregorian calendar), then, 2., the window of time or the day part, then next, 3., the venue of the deal, that is, will it be eat-in, carry-out or delivery, and finally, 4., the minimal dollar amount the consumer must agree to spend before this exact deal is triggered, and then finally, 5., the restaurant's "menu bonus bid".

A restaurant owner (or their authorized user) is able to use their private, password-protected dashboard to easily create, or, modify offers which will then be triggered by the next relevant consumer RFB. A restaurant owner could create targeted offers for Monday's ("late-morning") between the hours of 10:00 AM-11:00 AM—or offers that target Saturday's ("late night") between the hours of 10:00 PM-12:00 midnight.

For a restaurant that is open 24-hours, their 'Monday' bonus bids might be structured like this:

| DAYPART | MINIMUM CONSUMER OFFER | BONUS BID |
|---|---|---|
| 6:00 AM - 9:00 AM | $10.00 | 25.00% |
| 9:00 AM - 11:00 AM | $12.50 | 20.00% |
| 11:00 AM - 1:00 PM | $20.00 | 10.00% |
| 1:00 PM - 3:00 PM | $25.00 | 30.00% |
| 3:00 PM - 5:00 PM | $20.00 | 50.00% |
| 5:00 PM - 7:00 PM | $40.00 | 75.00% |
| 7:00 PM - 9:00 PM | $60.00 | 60.00% |
| 9:00 PM - 6:00 AM | $50.00 | 100.00% |

Or, if it was Friday night at 5:00 PM and there were more empty tables than usual, a restaurant owner could access their private password-protected dashboard and modify their then-current offer of, say, a 25% menu bonus credit for any consumer offer $25.00 or greater and change that offer to a 100% menu bonus credit, and lower the minimum amount the consumer guarantees to spend from $25.00 to $10.00. That is an example of the powerful flexibility the system can give restaurant owners.

Consumers will appreciate the fact that the disclosed system and method does not require pre-payment in advance, a credit or debit card number on file, or any financial information—at all—to be transmitted across the internet before a deal may be consummated. When a consumer does choose to execute a deal, the System simply generates a unique Ticket number for that transaction and then records details of the deal in both the restaurant and consumer's private dashboard.

Restaurant owners will appreciate the fact that they are able, with granular precision, to efficiently and effectively tailor their offers to only those customers whose revenue and day and time of arrival the restaurant owner believe will prove beneficial or profitable. In an embodiment, because there is no charge to use the system unless and until a deal is validated, a restaurant's cost is directly linked to a sale.

Delivery is an added cost for restaurant owners, so another advantage of the presently disclosed system is that it provides a method for owners to set a fee the restaurant will charge for delivery, a fee that will be calculated by the system, a fee the system shall reflect in auction results, when applicable, by subtracting that delivery fee from the calculated menu bonus result.

Thus, this invention provides a system and method that consumers may use to find the best possible offers from restaurant, a system that generates and executes user RFB-driven auction results, a system that restaurants may use to deliver dynamically-priced offers that will help fill their empty tables on the days and hours they so desire, a system whose efficiency, productivity and profitability could transform the profitability of the restaurant industry.

In an embodiment, the invention provides a rules-based bid generator that allows restaurants to offer consumers dynamically priced restaurant deals. To elicit offers from restaurants, consumers input into the system the amount of money the consumer guarantees to spend, minimally, as well as the hour of the day that a consumer contractually guarantees to—either—arrive at a restaurant to 'eat-in', 'carry-out', or expect to receive delivery of their order. Based on those data-points, and the geographic location of the user which the system infers from geo-data gathered from the electronic device used by the consumer, dynamically priced offers are automatically triggered and displayed to the consumer. In an alternative embodiment, the system may be configured to allow the consumer or the restaurant to specify one or more dates in the future rather than or in addition to the current date.

A ticket number is only valid when all elements of the deal, or a default deal, have been met. Deal elements include, e.g., the unique ticket number, the system assigned customer ID number, the system assigned restaurant ID number, the minimal amount of money the consumer guarantees to spend, the day of the year the consumer agrees to do so, the time of the day of the year the consumer agreed to do so, the 'venue' of the deal, namely eat-in, carry-out or delivery, the restaurant 'bonus bid' which is expressed as a percentage relative to the minimal amount of money the consumer guarantees to spend, the mathematical product of those two factors, and total deal amount, expressed in dollars.

Restaurant owners will be interested in bidding for consumers using this system for several reasons; not the least of which is that the system and method requires the consumer to first fully meet their commitments to the restaurant—before the restaurant's "side" of the deal is due the consumer. This contractual requirement will prove irresistible to restaurants because they will be able to use our System to create consumer demand, then funnel that demand into the hours, days and specific locations when and where the restaurant needs more customers and more revenue.

In an embodiment, to handle instances where a deal is subsequently ruled 'invalid' by the system because the consumer fails to arrive on the correct day or at the correct time or both, or at the correct restaurant location, the system provides a method for presenting a "default" deal to the consumer.

For example, assume a deal had been executed where the consumer agreed to arrive at Mr. Rudy's Ribs Restaurant "today" between 5:00 PM-6:00 PM and spend $20 at a minimum. The restaurant bid a bonus of 25% and the consumer accepted and executed an RFB comprised of those elements. Therefore, the restaurant's "menu bonus" bid equals $5, and thus the total deal value is $25.00. ($20 consumer minimum+$5 restaurant menu bonus). Now, if the consumer arrives at 8:30 PM and presents that ticket, the system will rule that an unenforceable Ticket has been submitted and rejected as invalid. The system will then look at the Restaurant Default Offer Database to determine what 'default deal' had been created—simultaneously—with the deal which the system has just ruled is invalid. Assume, during registration with the system, the restaurant owner chose a default deal bonus percentage of 10% (step 1813). Thus, the default deal bonus percentage the system calculated would have been $2.00, ($20×10%), thus a total Default Deal value of $22.00. That's the value the system will display as the restaurant's default deal inside both the consumer and the restaurant's dashboard. The consumer has the option of accepting or rejecting the restaurant's default offer. The system records the consumer's Yes/No response to the restaurant's default offer and responds either by terminating the consumer/restaurant interaction or by recording the consumer's acceptance of the restaurant's default offer—then generating and sending a system invoice to the restaurant.

In an embodiment, the system records every deal ticket redemption attempt. When an authorized restaurant representative enters a Ticket #which the system detects is valid, or when a restaurant representative or the consumer indicates the consumer's consent and acceptance of the default offer, the system assumes the restaurant has met, or will meet all other obligations to the consumer and a record is created in the Validated Deals Database and an Invoice generated.

In an embodiment, the system is configured so as not to require a consumer to provide financial information of any kind to complete a transaction on the system. For a consumer-user to complete a transaction binding a restaurant to its offer, consumers are only required to provide, or have provided, the system with an email address or a mobile telephone number to which a verification link was sent and a valid response from a user is received by the system. Once a consumer-user is registered in the system, both the restaurant and consumer are contractually bound to honor deal terms.

The system may be configured such that participating restaurants are required to be registered and approved users of the system. Upon initial registration with the system, each restaurant's location is assigned a Unique Restaurant ID so as to distinguish different restaurant locations that might be owned by the same company, or franchisees of the same franchise system, i.e. McDonalds, Burger King, Starbucks, etc. Further, the system and method requires that restaurant identities be displayed alongside their bids in order to help a consumer form an opinion as to the quality of the goods or services the restaurants are offering.

In order to protect the integrity of the process and to continue to protect the anonymity of the restaurant customer, the system may notify the restaurant of some, but not all, terms of the deal. For example, the System may notify the restaurant of the time of day to which the consumer has bound themselves, but the System may veil from the restaurant the amount of money the consumer has agreed to spend and/or what "bonus" bid by the restaurant was successful. The reason this step may be necessary is to prevent circumvention of the validation steps the System requires to avoid paying owners of the system a fee due for each deal validated.

In an embodiment, when it comes time for the system to rule whether a Ticket #is valid, after an authorized restaurant representative logs-in to their 'side' of the app and enters the Ticket #, the system is thus able to verify the consumer is at the correct restaurant location. The system inspects the date and time-related elements of the Ticket, then calculates the current, actual date and time to determine if those crucial elements of the deal requirements are satisfied. If so, then the system has verified via 2-step validation, that strict adherence to the terms of the agreement are being honored; a consumer with a valid ticket has arrived at the right time and at the right place. An invoice is then generated by the system.

Because invoices are automatically generated, the system also provides a method by which restaurant owners are able to dispute an invoice. For a myriad of reasons an invoice might fairly be disputed. For example, if a consumer had executed an RFB agreeing to spend $20 minimally, today at Mr. Rudy's Ribs and arrive between 5:00 PM and 5:30 PM, an invoice would have been generated by the system when the consumer "checked in". However, if the consumer had only spent $19, refusing to honor his agreement to spend $20, the system provides a method for authorized restaurant representatives to search for a Ticket #by date and time and to mark an invoice as 'disputed'. The system can quarantine that invoice until the dispute is resolved between the system owner and the restaurant owner.

The method and system of the present invention in accordance with an embodiment thereof will now be discussed with reference to FIG. 1. In a preferred embodiment, the present invention includes a central controller 100, and associated databases maintained in a data storage device 101, authorized restaurant representative interface such as a mobile device running the Microsoft Windows or Apple Macintosh operating Systems such as an iPhone, Android or tablet device like an iPad, running a web browser, browser plug-in, or other application connected to the Internet, typically accessible locally by Internet Service Providers and other means 102, and a prospective restaurant customer interface such as a mobile device running the Microsoft Windows or Apple Macintosh operating Systems such as an iPhone, Android or tablet device like an iPad, running a web browser, browser plug-in, or other application connected to the Internet, typically accessible locally by Internet Service Providers and other means 103.

In an embodiment, a processor is configured to interface with both the restaurant interface and the restaurant customers by receiving data from and sending data to HTML and other web pages utilizing the Internet or by other well-known methods to send and receive such data. It has a CPU, memory, disk drive, operating system, network adapter (such as Ethernet) and other components typical of network servers.

The various databases utilized by the system and maintained in a data storage device 101 may include a Restaurant Offers Database 1000, Restaurant Default Offer Database 2000, Pending Deals Database 3000, Validated Deals Database 4000, Unique Ticket Numbers Database 5000, Valid Delivery Addresses Database 5001, Attempted Validated Deals Database 6000, Invalid Deals Database 7000, Account Receivable Database 8000, Consumer Users Database 9000, Restaurant Clients Database 10000, Restaurant Delivery Charge Database 11000, and Disputed Invoices Databases 12000, all of which may contain a CPU, memory, disk drive, operating system, network adapter (such as Ethernet) and other components typical of network servers, as well as a database application (such as those from Oracle).

The underlying network transport may be any communication medium including, without limitation, cellular, wireless, Wi-Fi, small cell (e.g., femto), and combinations thereof.

The preferred embodiment begins in FIG. 1 when an authorized restaurant representative accesses the system's Central Controller step 103 which, in turn, accesses step 104 the System Data Storage Device 101 in order to create a new restaurant offer, or modify an existing offer (FIG. 13) changes, or additions which are returned to the Central Controller step 105 and then reflected in the authorized restaurant representative's interface step 106 to be saved, or discarded. A prospective restaurant customer (also called 'the user', 'the consumer', or 'the customer') step 107 is also able to access the System Central Controller at step 103 to form a 'Request For Bid' (RFB) step 108, FIG. 2, which is sent to the Data Storage Device 101 which 'answers' the RFB via step 109 to the Central Controller and from there to the prospective restaurant customer's interface step 110.

Figure 2:
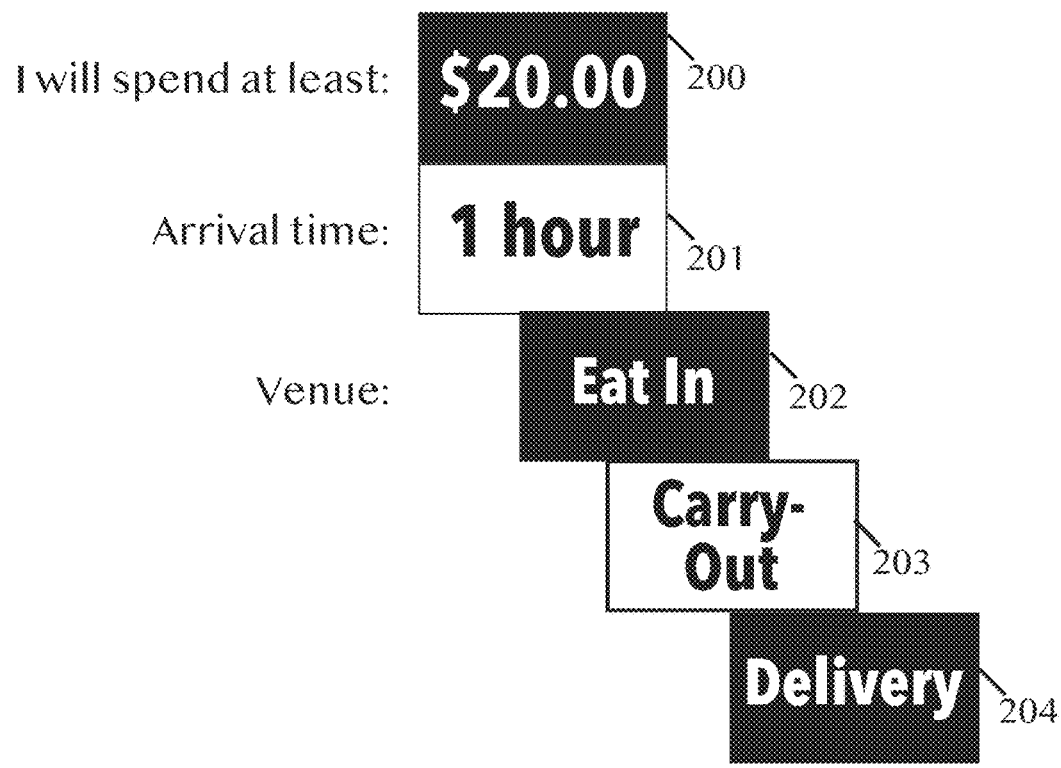
FIG. 2 describes the three elements which comprise a prospective restaurant customer's Request For Bid (RFB).

FIG. 2 illustrates the three elements that comprise a Request For Bid. The first element is the amount of money the user guarantees to spend, minimally, step 200 if the user subsequently accepts an offer from a participating restaurant. (See FIG. 3.) The second element is the time step 201 at which the user promises to honor the deal. The final element of the RFB is the 'venue' of the deal; namely, whether the user will arrive at the restaurant expecting to "eat-in" step 202, or whether the user's order will be ready for carry-out step 203—or the time the user will be expecting an order to be delivered step 204.

Figure 3:
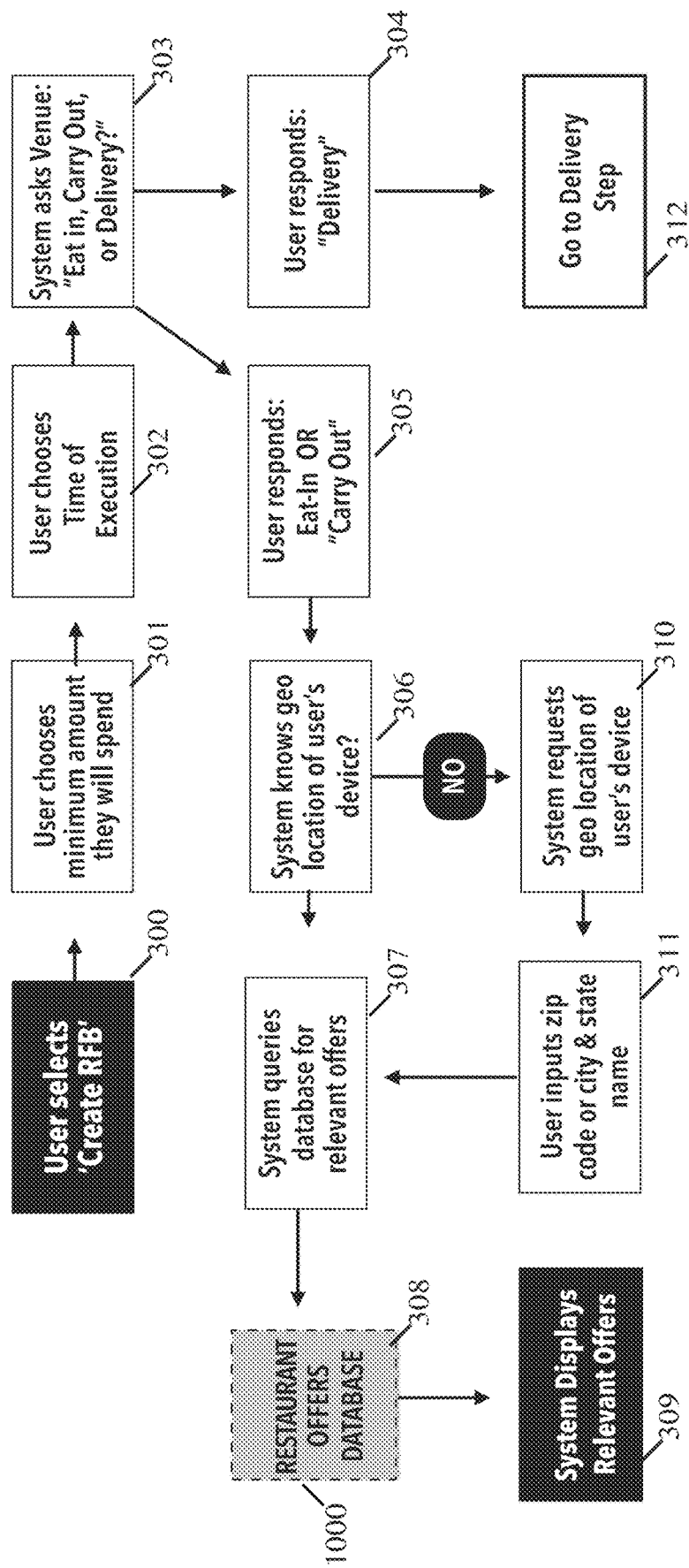
FIG. 3 describes the steps by which a prospective restaurant customer creates an RFB to solicit offers from restaurants, the system determines the geographic location of the user, queries its database for specifically-responsive offers and upon finding any, then displays them to the prospective restaurant customer.

FIG. 3 illustrates how a prospective restaurant customer begins creation of a Request For Bid step 300 by opening a proprietary app, or by accessing a proprietary website and at step 301 specifies the minimum amount of dollars the prospective restaurant customer guarantees to spend at a participating restaurant, then specifies the Time (today) step 302 the prospective restaurant customer agrees to arrive at a participating restaurant or, if the user subsequently chooses at step 303 the option of 'Delivery' step 304, the time at which the user expects Delivery. System then presents the consumer with three options step 303: Eat-In or Carry-Out step 305, or Delivery step 304. If the consumer answers either 'Carry-Out' or 'Eat-In' step 305, and if the System is able to determine the geographic location of the user which the system infers from geo-data gathered from the electronic device used by the consumer step 306 then the System queries step 307 its Restaurant Offers Database 1000 step 308 to determine if there exists responsive, relevant offers from participating restaurants and if so, displays those offers step 309—but if the System cannot deduce the approximate geographic location of the device step 306 the user utilized to access the System then the System requests at Step 310 the user input the zip code or the name of the city and state of the user's current location step 311 which will enable the System step 307 to query its Restaurant Offers Database 1000 step 308 to determine if there exists responsive, relevant offers from participating restaurants and if so, displays those offers step 309. If the user had specified "delivery" at step 304, then system transitions to the Delivery steps at step 312.

Figure 4:
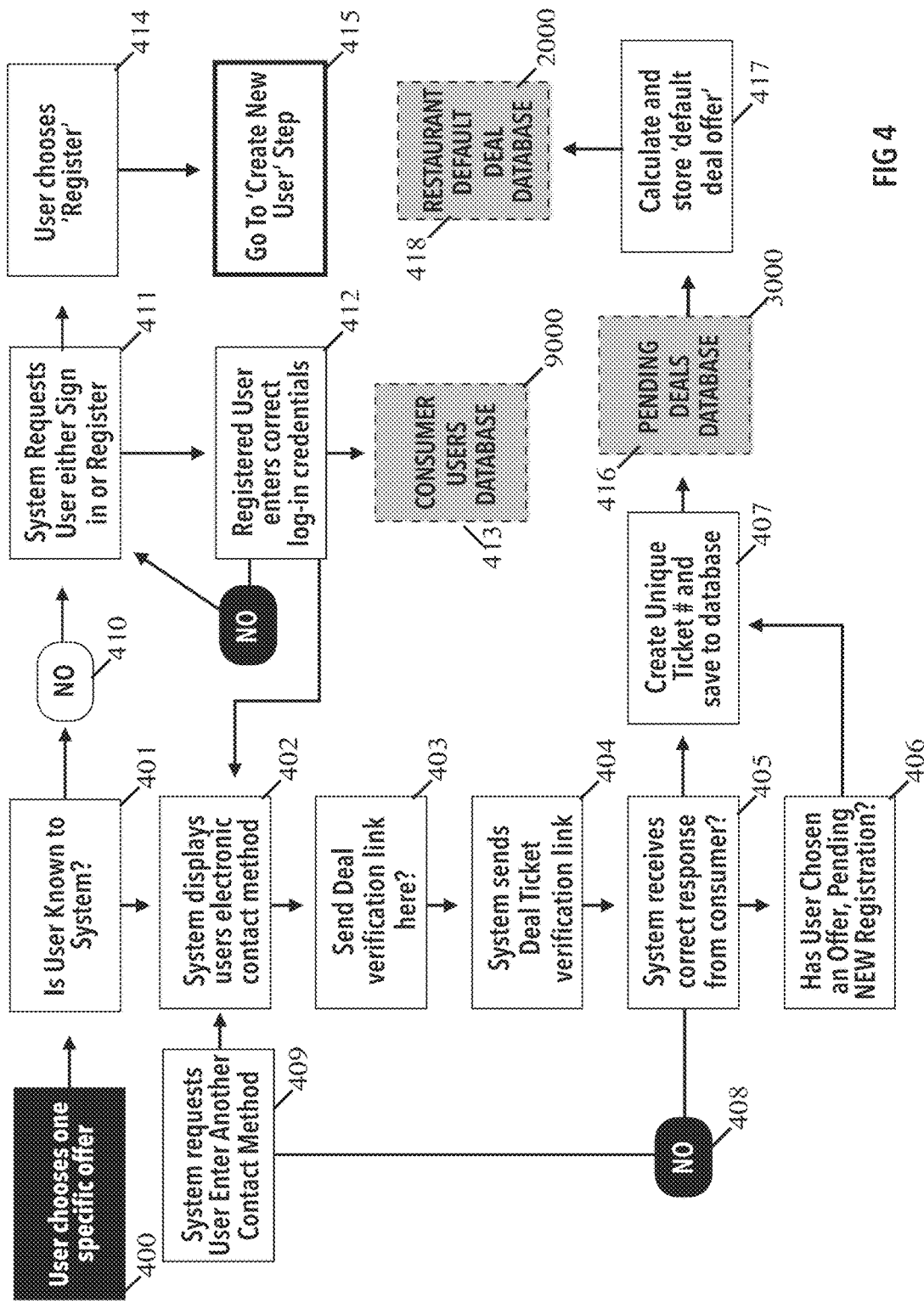
FIG. 4 describes the step by which the prospective restaurant customer chooses an offer from one or more restaurant offers presented him by the System and by which the System calculates and stores a 'default offer' which may be presented the consumer if the consumer does not honor all deal terms.

With reference to FIG. 4, once a consumer selects at step 400 one of the relevant offers the System displayed which were responsive to a consumer's RFB, an offer which is comprised of the Deal Ticket Elements illustrated in FIG. 8, then at step 401 the system determines whether the system knows the user's email address or a mobile number which the user previously used to request or validate an RFB; and if so, at Step 402 displays that email address or a mobile number, then asks step 403 the user to confirm a 'deal verification' link be sent step 404 to that email address or a mobile number, and if the System receives validation step 405 of that deal verification link, the System checks to see if the user is a newly registered user step 406, and if so, the System then creates step 407 a Unique Ticket number and stores that number step 416 in the Pending Deals Database 3000, and then, also, further, calculates step 417 and stores step 418 in the Default Deal Database 4000, the 'Default Offer' which will be presented to the consumer only if and when the System detects an invalid ticket #has been presented. If there already exists in the Consumer Users Database step 413 a record for the user, the System 'skips' step 406 and proceeds to create step 407 a Unique Ticket number which it stores step 416 in the Pending Deals Database 3000. At step 408 if the System does not receive a valid response to a verification link it had sent, the System step 409 requests the user enter a different email address or mobile number which, after the user does so, the System displays to the user step 402. At step 401 when the system is unable to determine that it knows the identity of the user step 410, the System requests the user sign-in step 411 if the user is a registered System user. If the user enters their correct user credentials step 412, the System transitions to step 402 to display the user's email address or a mobile number. If the user chose step 414 to "Register" as a new user, the System transitions step 415 to the "Create New User" steps.

Figure 5:
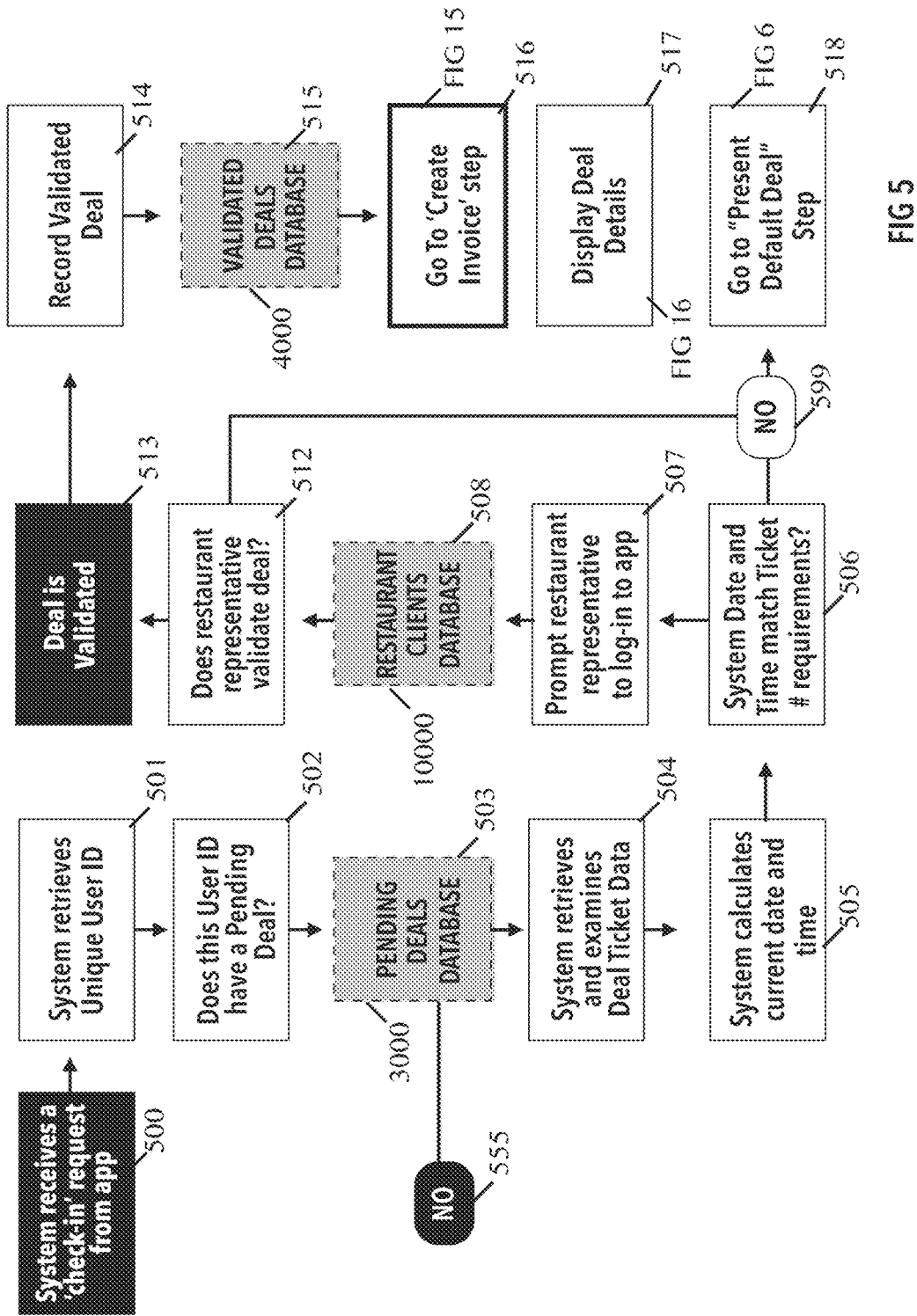
FIG. 5 describes the steps by which the System responds to a Ticket Validation attempt by a consumer-user and a restaurant's attempt to verify the validity of a Ticket #.

With reference to FIG. 5, when the system receives a "check-in" request from a consumer's app at step 500, the system retrieves the UserID from the app at step 501, then examines step 502 the Pending Deals Database 3000, to determine if this user has a Pending Deal step 503, if not, step 555 the system terminates the Ticket Validation steps. If the Pending Deals Database 3000 verifies that the user associated with this UserID has a Pending Deal, the system step 504 retrieves and examines all the elements which comprise a Deal Ticket, FIG. 8, then calculates step 505 the current System Date and Time. If the current System Date and Time match the Date and Time requirements step 506 as contained in the RFB (FIG. 8), the system then prompts step 507 an authorized restaurant representative to sign into the System and affirm they wish to 'validate' step 512 the deal the System is currently examining. If the authorized restaurant representative agrees to affirm the deal, step 513 the system records step 514 that the deal is validated, thereby completing 2-step verification, the deal now having passed all System tests; confirmation the consumer who presented the Deal Ticket #is the same consumer who first guaranteed to honor this specific deal and who has—demonstrably—arrived at the specific restaurant location named in the RFB, on the correct date and within the time requirement of the Ticket #. The System stores a record of the deal step 514 in the Validated Deals Database 4000 step 515 and then the Create Invoice step is initiated step 514. If the system determines that the restaurant customer is not at the correct restaurant location step 599, or that the System Date and Time do not match the Date and Time requirement of the RFB, step 599, then the Present Default Deal step is initiated, step 518.

Figure 6:
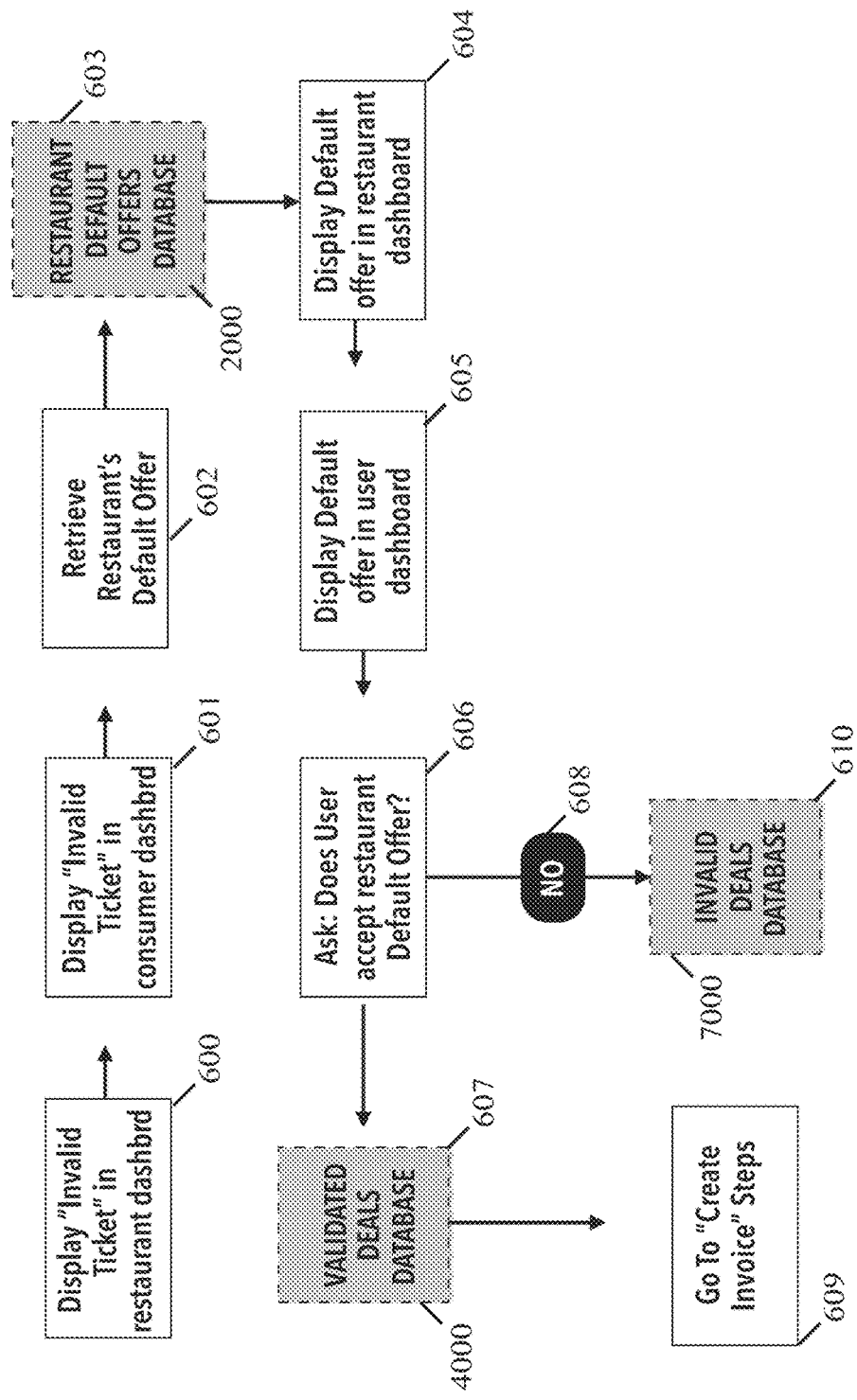
FIG. 6 describes the steps the System follows to present the terms for a 'Default Deal' after the System deems a Ticket #as "invalid".

With reference to FIG. 6, the consumer step 600 and the client restaurant step 601 are notified that a Ticket #which has been presented is invalid, triggering the System to retrieve the "Default" restaurant deal step 602 from the Default Restaurant Offer Database 2000, step 603. (Creation of a 'Default Offer bonus percentage' is a mandatory field that restaurant owners must complete as part of the initial 'new' restaurant registration process.) The System calculates then displays that Default offer inside both the restaurant customer's dashboard step 604 and inside the dashboard of the restaurant step 605. The System asks the consumer to accept or decline that offer step 606. If the consumer refuses the Default Deal step 608 that refusal is noted in Invalid Deals Database 7000 at step 610. If the customer accepts step 607 the Default offer, that acceptance triggers the Create Invoice FIG. 15 step, step 609.

Figure 7:
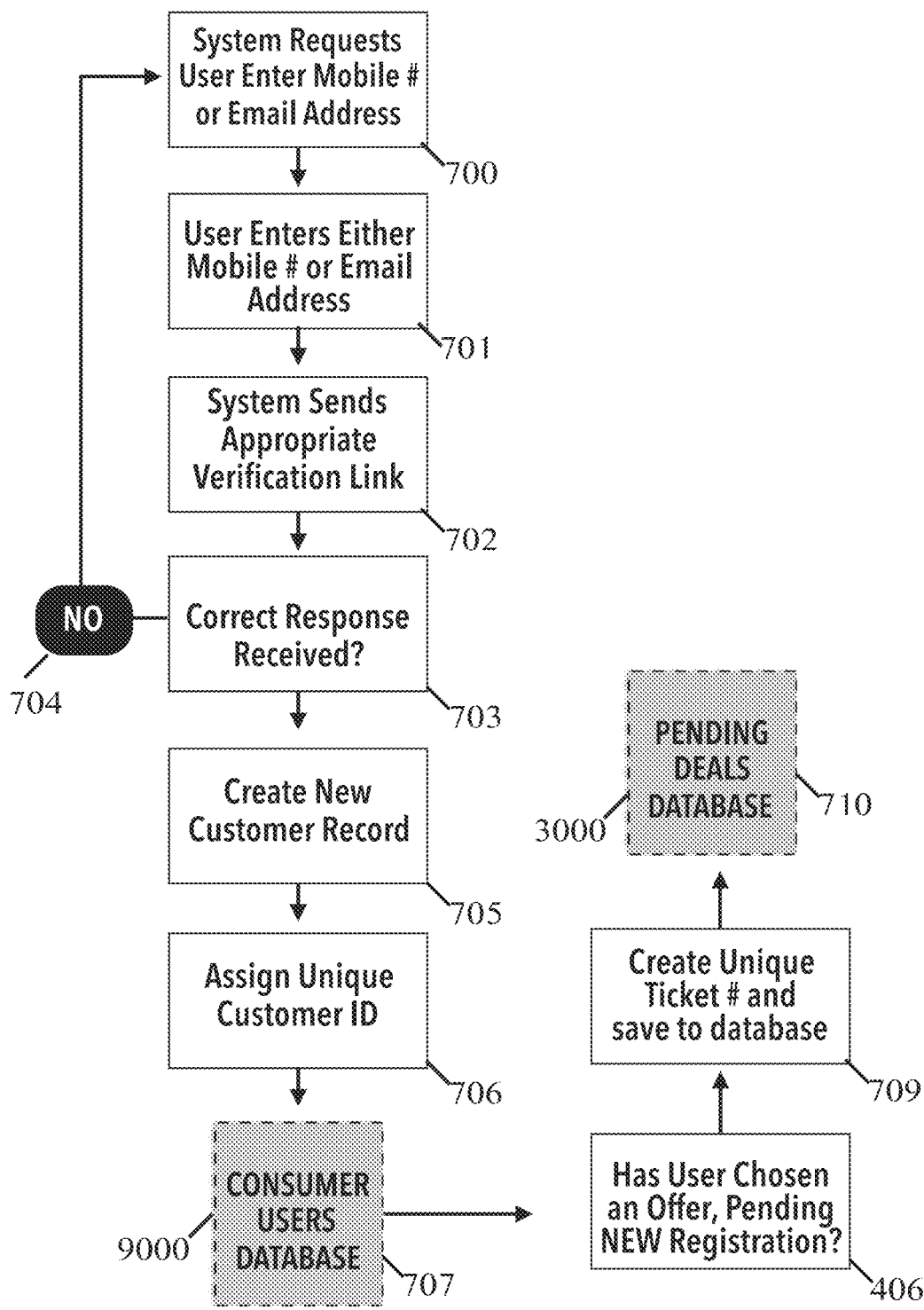
FIG. 7 describes the steps by which the System creates a record and a Unique User ID #for a new user of the System.

With reference to FIG. 7, here is illustrated the discrete fields the System requires be completed before a new prospective restaurant customer record is created. The System requests step 700 the user either a verifiable email address or a verifiable mobile telephone number be entered. The user does so at step 701 and the System evaluates the type of data the consumer just entered and then sends the appropriate type of verification link, step 702. If the System receives the appropriate response from the consumer step 703, the System creates a "New" user record at step 705 and assigns step 706 a Unique Customer ID to that new record and stores that record step 707 in the Consumer Users Database 9000. If the System began the Create New Consumer User step because this user had chosen to accept an RFB step 708, but was not registered with the System, then the System creates a Unique Ticket #for that deal step 709 and stores that deal in the Pending Deals Database 3000 step 710. If the System does not receive the appropriate response from the consumer step 703 to a verification link the System had sent step 704, the System again asks the consumer to enter either a verifiable email address or a verifiable mobile telephone number.

Referring now to FIG. 8, here are illustrated the discrete fields of a "perfect" deal Ticket record. Also illustrated are sample 'dummy' data corresponding to each of those fields in the record. Step 800 is a Unique Ticket Number the System assigns each RFB. Step 801 is the Unique ID of the prospective restaurant customer (the user) who created the RFB. Step 802 is the Unique ID of the restaurant whose bid the user accepted at the conclusion of the RFB process demonstrated in FIG. 4. Step 803 is the Day of the Year the user promised to honor the RFB. Step 804 is the "venue" of the RFB. Step 805 is the hour of the day (of the Day of the Year) both parties agree and promise to honor the RFB. Step 806 is the additional Menu Bonus Bid, expressed as a percentage, both parties agree the consumer will receive after the consumer first spends the minimum dollar amount Step 807. Step 808 is that calculated Menu Bonus Bid amount, expressed in dollars. Step 809 is the sum total of Step 807 and Step 808. Step 810 is the fee a restaurant may choose to charge for delivery. Step 811 is the sum total of step 807 and Step 808, minus the amount, when applicable, of Step 810.

Figure 9:
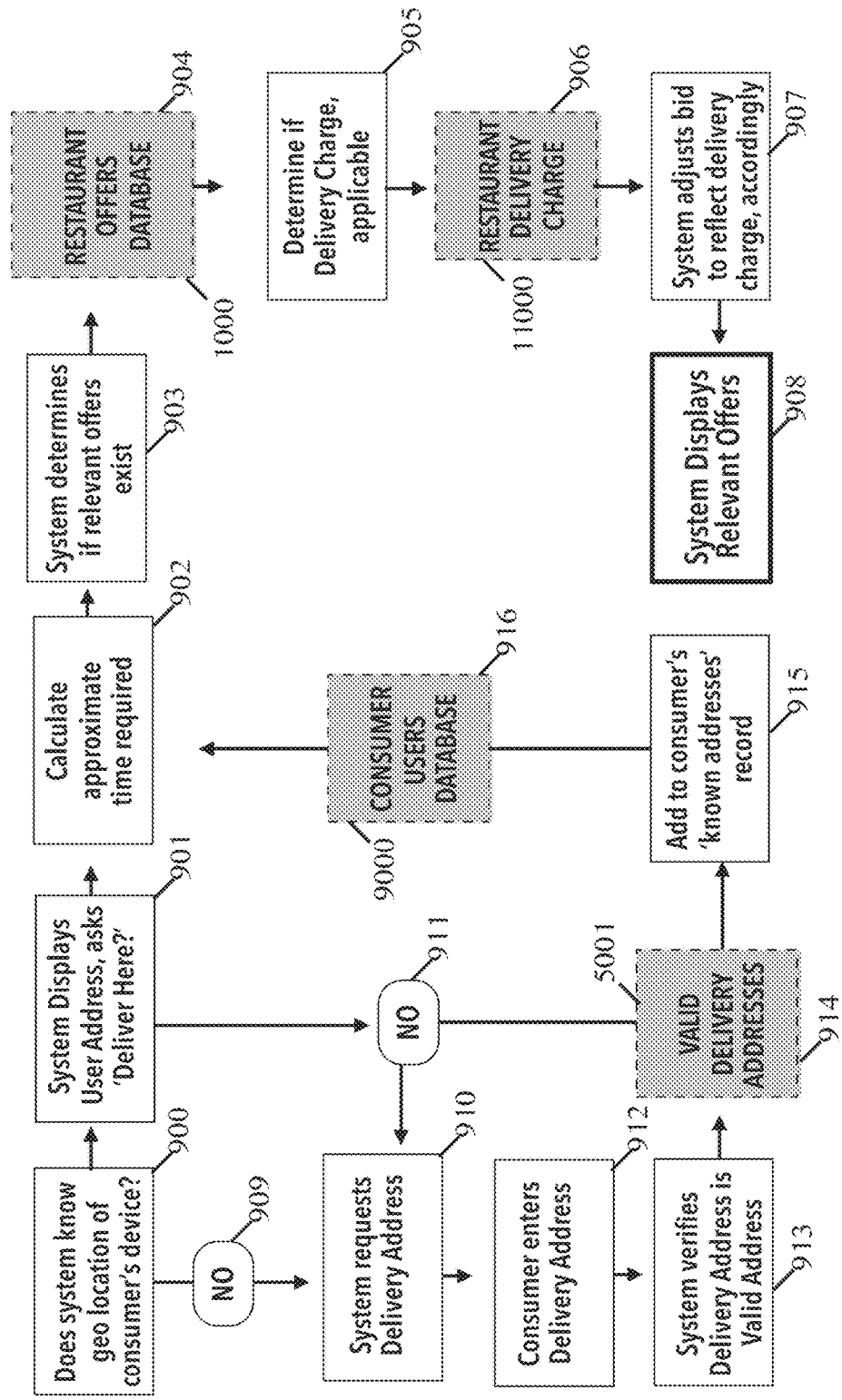
FIG. 9 describes the steps by which the System responds when a consumer requests 'Delivery' of their order.

With reference to FIG. 9, here is demonstrated the steps the System executes when the consumer specifies, in their RFB, that they wish to receive delivery of their order, rather that eat-in or carry-out. At step 900 the system determines whether it is able to deduce the geo location of the consumer's device from GPS data the system contemporaneously gathers as the consumer is creating the RFB. If so step 901, the System displays the address then asks if the address being displayed is where the order should be delivered. If the consumer responds affirmatively, the System estimates the approximate time required for delivery to that location then step 903 queries the Restaurant Offers Database 1000 to determine if there exist any relevant offers, and if so step 904 next queries the Restaurant Delivery Charges Database 1100 to determine which individual restaurant bids are require a delivery charge when delivery is requested, and how much that delivery charge is so that step 907 the bid the System is about to subsequently display step 908 properly reflects those delivery charges, where applicable. If the system is not able step 909 to deduce the GPS location of the device the user is using to create the RFB, the System will request the user enter the address to which the order should be delivered step 910 and after the user enters an address step 912, the System will examine its database of Valid Delivery Addresses 5001, and if the address is valid step 915 the System adds that address to the record of the Consumer Users Database as a 'verified' address for that user, then the System moves to Step 902. If the System is unable to verify the address the consumer adds step 911, the System will ask the user to enter a valid delivery address, Step 910.

Figure 10:
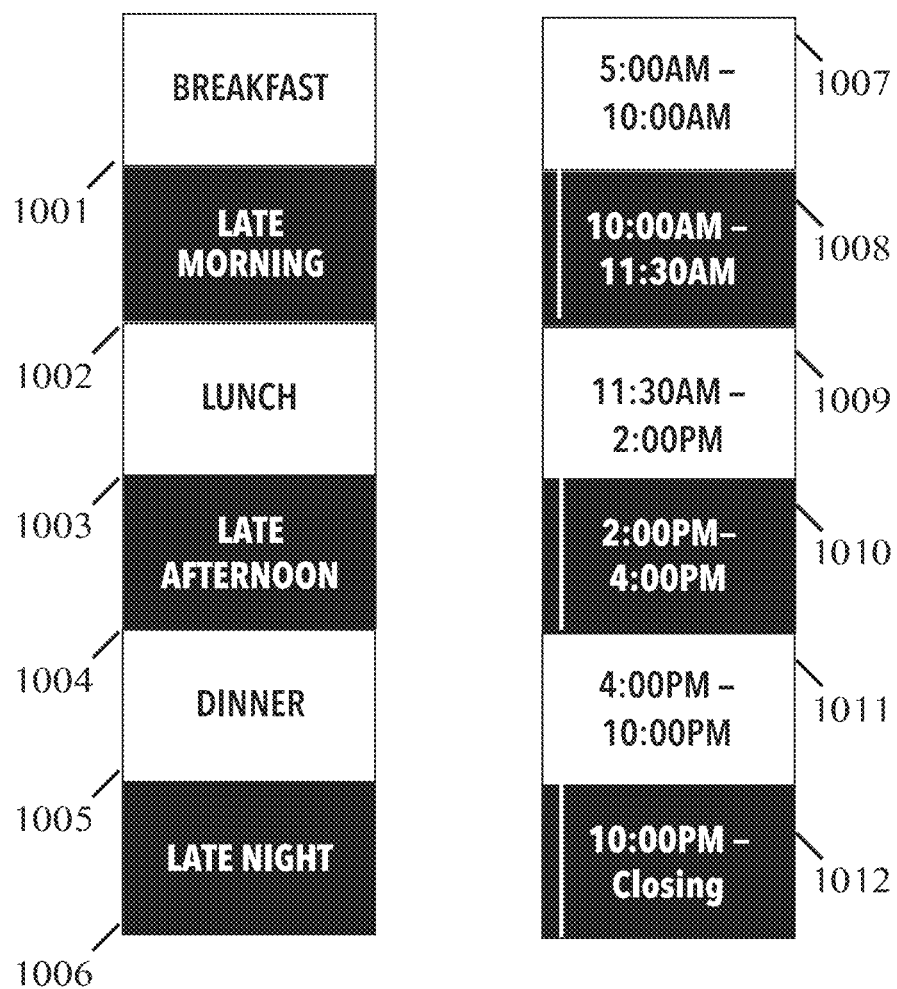
FIG. 10 illustrates the hours of the day which might comprise the Day Part portion of the Deal Element.

Referring to FIG. 10, illustrated here are the six sample restaurant Day Parts broken down by the applicable hours; Breakfast from 5:00 AM until 10:00 AM step 1001, Late Morning 10:00 AM until 11:30 AM step 1002, Lunch from 11:30 AM until 2:00 PM step 1003, Late Afternoon from 2:00 PM until 4:00 PM step 1004, Dinner from 4:00 PM until 10:00 PM step 1005 and Late Night from 10:00 PM until closing time step 1006.

Figure 11:
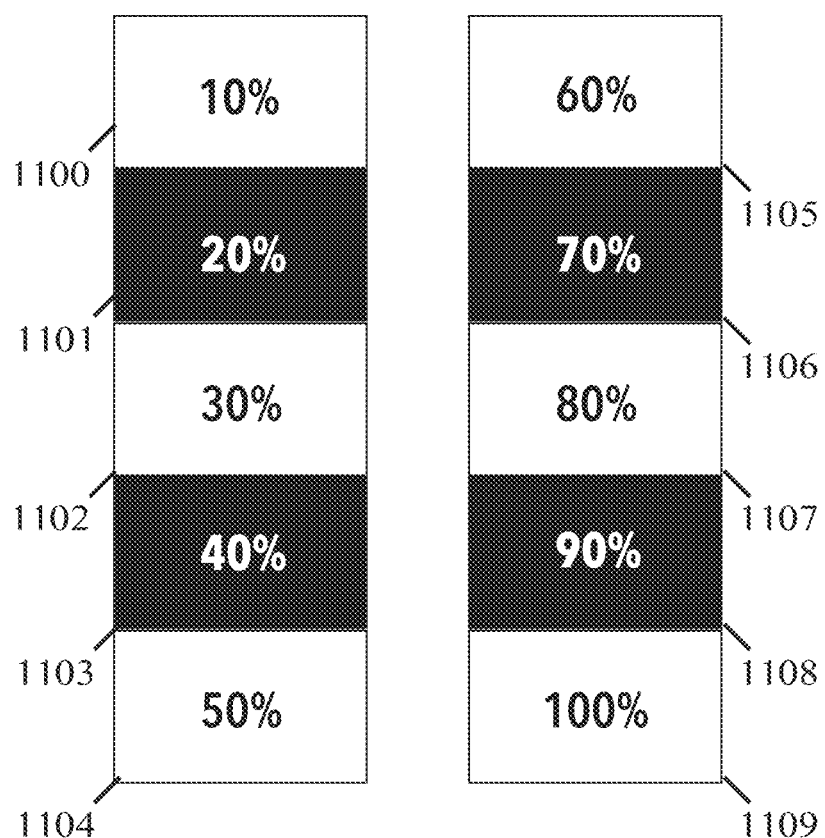
FIG. 11 illustrates the various percentages from which an authorized restaurant representative is able to choose as they create the Bonus portion of the Deal Element.

Referring to FIG. 11, illustrated here are the several percentages, one and only one of which a restaurant must choose, in advance (FIG. 12, step 1209) which will comprise one of the three components of a restaurant's bid that the system may display in response to a consumer's RFB.

Figure 12:
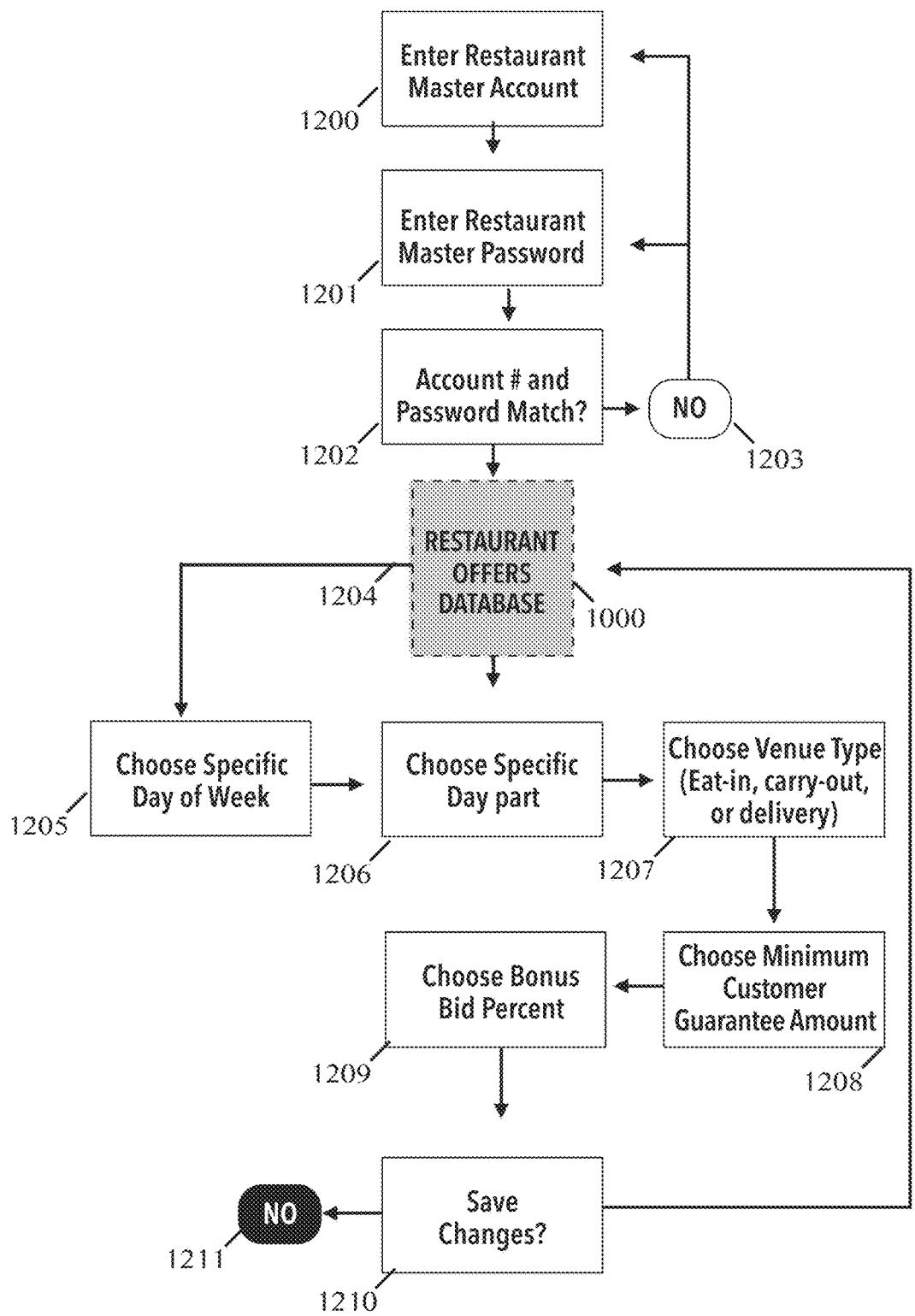
FIG. 12 describes the steps an authorized restaurant representative would follow as they seek to create new offers or modify existing offers.

FIG. 12 illustrates how a restaurant is able to access its account step 1200 maintained on the system, enter the restaurant account number at step 1200, the account 'master' password step 1201, and if system determines the account and password match step 1202, give an authorized restaurant representative access to the Restaurant Offers Database 1000 where that particular restaurant's offers are maintained inside the system step 1200. To create a new offer or to modify an existing offer, an authorized restaurant representative would first choose the Day of the Week step 1205, the specific Day Part step 1206 of the previously selected Day of the Week, then the 'venue' step 1207 of the offer, then the Minimum Consumer Guarantee required step 1208, and the restaurant's Bonus Bid percent. Lastly, whether the System should save the newly created or modified offer step 1210 or discard those changes, step 1211.

Figure 13:
FIG. 13 illustrates the various dollar amounts from which a consumer is able to choose as the consumer creates the monetary portion of their Request For Bid (RFB).

FIG. 13 illustrates the monetary component of the consumer's RFB; the minimum amount the consumer guarantees to spend, if the consumer accepts an offer from a restaurant. The system uses the minimum amount the consumer guarantees to spend to calculate the restaurant's offer of a "bonus" to the consumer for performing and fulfilling the promises made to the restaurant by the consumer. Effectively, it's a "menu bonus". The System does this by multiplying the minimum amount the consumer guarantees to spend by one of the percentages illustrated, above, in FIG. 11 to calculate the 'Menu Bonus' amount of a restaurant's offer, and then the sum total value of the restaurant's bid. For example, if a consumer agrees to "eat-in" step 202 at a restaurant this evening and to spend, minimally, $20.00 step 1303 and walk in the 'winning' restaurant's doors tonight between 6:00 PM and 7:00 PM step 1011, then if that consumer accepts a particular restaurant's offer of a bonus of 50% step 1104, that means the consumer will receive from the restaurant a menu 'credit' of $10.00 (50% of $20.00) for a TOTAL deal value of $30.00 ($20+$10) if, and only if, the consumer arrives on time at the right restaurant location and purchases, minimally, $20.00 worth of food and/or drinks. The consumer will pay the restaurant $20.00 but receive $30.00 worth of goods and services. Of course, the consumer is still liable to the restaurant for any amount they spend greater than $30.00.

Figure 14:
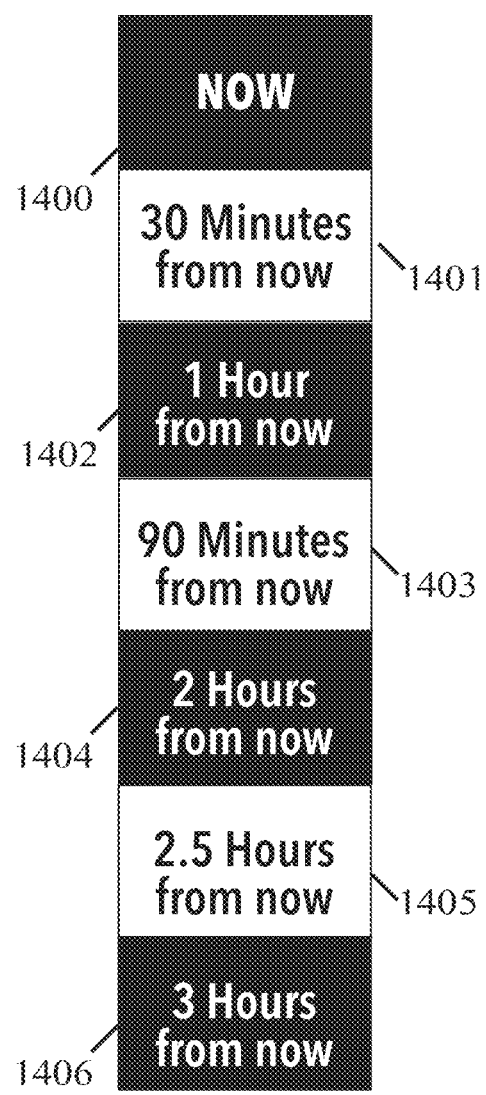
FIG. 14 describes the window of time during which the customer promises to arrive at the restaurant to eat-in or if applicable, carry-out their order, or, if applicable, the time the consumer expects to receive delivery of their order.

FIG. 14 illustrates the time-related component of the system. The System is time 'aware'. Therefore, if a consumer creates an RFB in which the consumer promises to arrive "now" step 1400 the System will first examine the System clock to determine what the actual time is currently, then seek to find offers from restaurants which are valid at 'this' moment in time. Or, the consumer may seek offers from restaurants thirty minutes from now step 1401, sixty minutes from now step 1402, ninety minutes from now step 1403, 120 minutes from now step 1404, 150 minutes from now step 1405, or 180 minutes from now step 1406.

Figure 15:
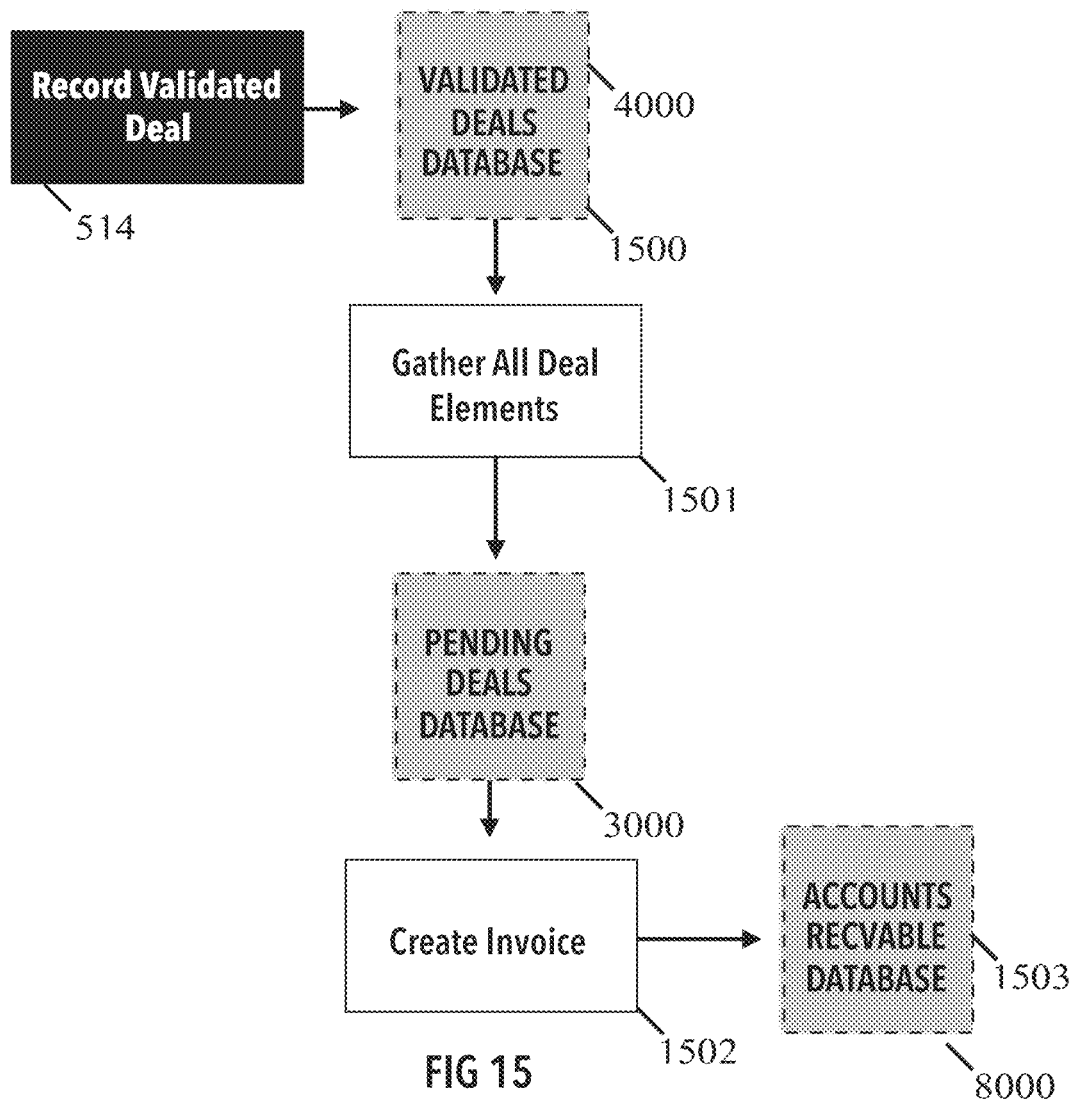
FIG. 15 describes the steps the System follows as it creates an Invoice it will electronically deliver to restaurant after a Ticket #is validated by an authorized restaurant representative upon a customer's arrival at the correct restaurant location during the time window to which they had committed.

Referring to FIG. 15, once a Ticket #is entered by the System step 1500 into the Validated Deals Database 4000, the System gathers all deal elements of the Ticket step 1501 from the Pending Deals Database 3000 and an Invoice created step 1502 and recorded in the Accounts Receivable Database 8000, step 1503.

Referring to FIG. 16, here is illustrated the information about a Ticket #that is displayed inside that restaurant's dashboard after a Ticket #has been validated. Note: none of the information being displayed is being newly created. All data displayed here has already been created by the System at various times during either the RFB, bid, or validation process. The data displayed here includes: Ticket ID step 800, the minimum amount the consumer promised to spend step 200, the Venue of the deal step 203, the Bonus Bid Amount the restaurant offered step 806, the system calculated dollar-equivalent amount of the restaurant's Bonus Bid Amount step 808, the Total Deal Value step 809, whether the consumer, or the delivery arrived on time step 201, and then the date and timestamp the deal was validated by an authorized restaurant representative such as a restaurant manager step 513 or a delivery driver, or by the consumer themselves step 606.

Figure 17:
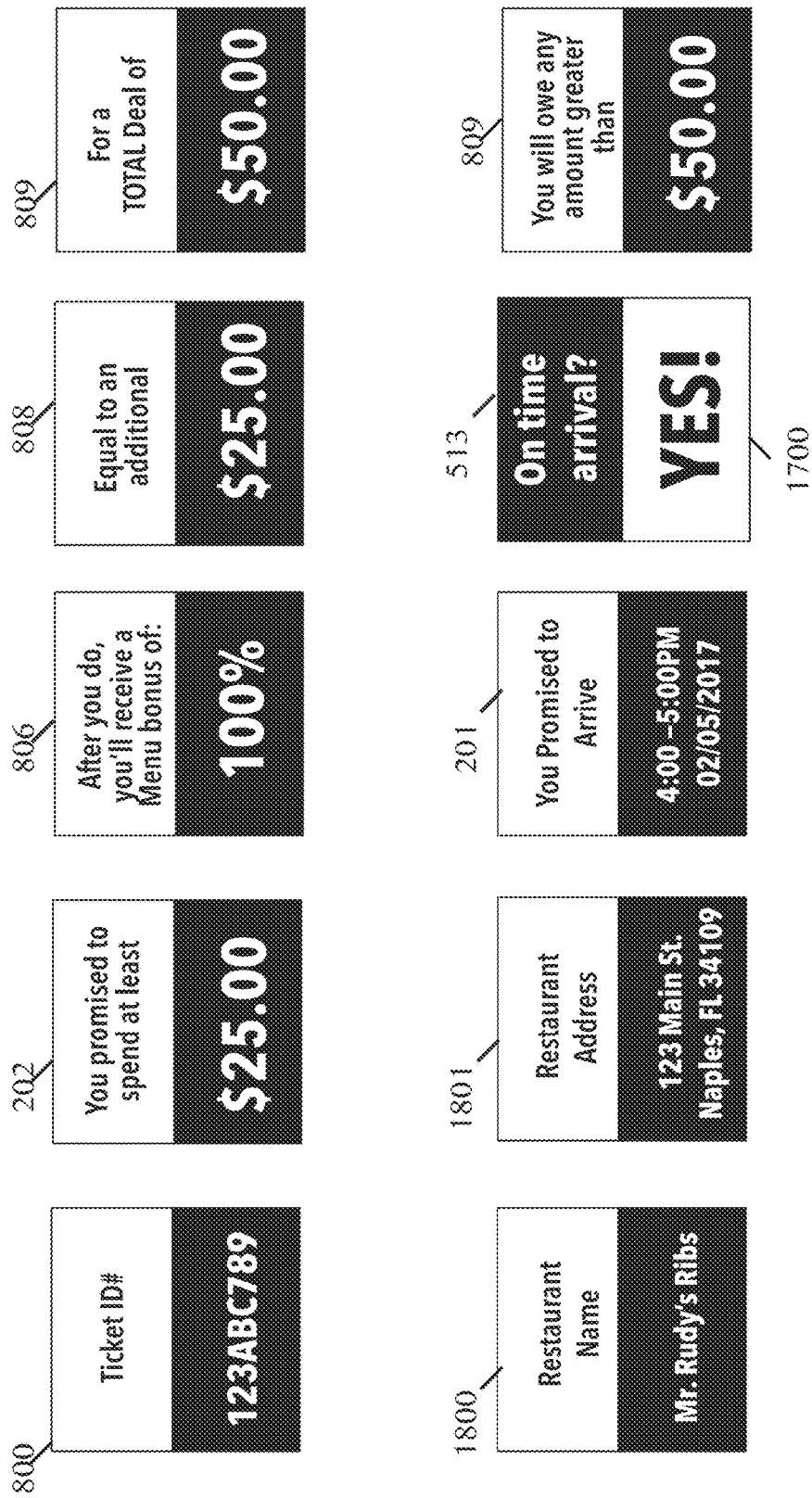
FIG. 17 illustrates what information the System displays inside a restaurant customer's private 'dashboard' after a valid Ticket #has been presented for validation.

Referring to FIG. 17, here is illustrated the information the system displays to the restaurant customer in the customer's private dashboard after a valid ticket has been presented, and validated. The Ticket #step 800, the minimum amount they promised to spend step 202, the restaurant bonus amount step 806, the restaurant bonus amount expressed as dollars step 808 for a Total Deal Amount step 809. Further shown is the restaurant name step 1800, address step 1802, the time Ticket #was validated step 513 and the Total Deal Value, step 809.

Figure 18:
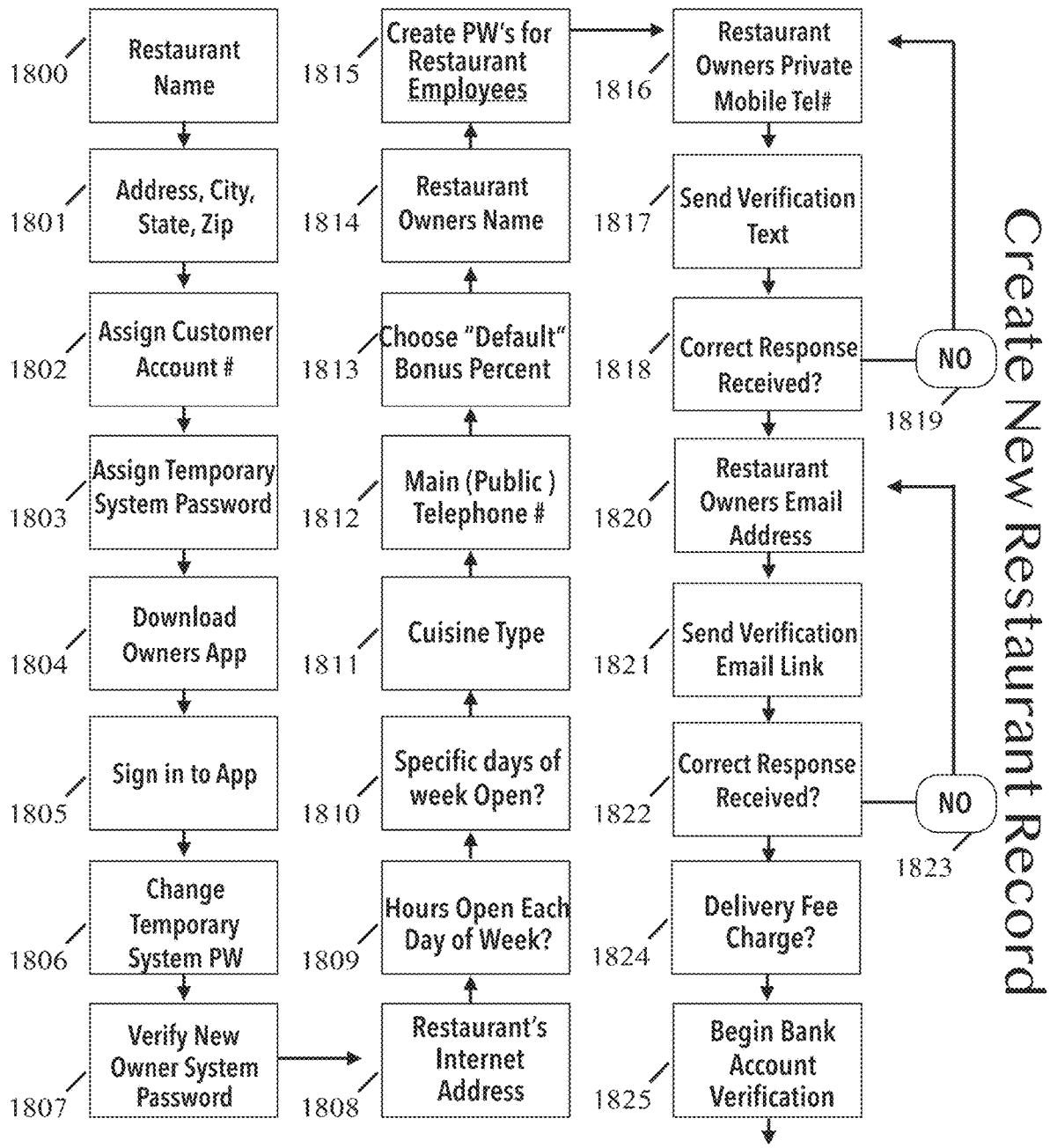
FIG. 18 describes the steps the System requires as a restaurant attempts to register with the System by creating a new account.

With reference to FIG. 18, this illustrates the Restaurant Client registration process which begins when an authorized restaurant representative inputs the Restaurant Name step 1800, its street address, city, state and zip code step 1801, a system-assigned Unique Customer Account number step 1802, a system-assigned temporary password step 1803, the presentation of a link which will download an app step 1804, which then requires step 1805 the user sign-in to the app, and then that the system-assigned temporary password be changed step 1806, and the new password chose be verified step 1807, the restaurant's internet web address step 1808, the specific hours the restaurant is open each day of the week step 1809, the specific days of the week the restaurant is open 1810, the type cuisine served at the restaurant step 1811, the restaurant's main business telephone number step 1812, the restaurant's "Default" bonus percent step 1813, the name of the owner of the restaurant step 1814, creation of a password for authorized restaurant representatives, the restaurant owner's mobile telephone number 1816, to which the System sends a verification text step 1817, and if a correct response to that text is received step 1818, and if not, at step 1819 the restaurant owner's telephone number is again requested step 1816, the restaurant owner's email address is requested step 1820, to which a verification email link is sent by the System step 1821. If no or an incorrect response is received step 1823, then step 1820 is repeated, but if a correct response is received, then at step 1824 the delivery fee, if any, the restaurant will charge if the restaurant chooses to bid for deals that require delivery, and finally, at step 1825 the System requests the authorized restaurant representative's begin verification of the restaurant's banking credentials.

Figure 19:
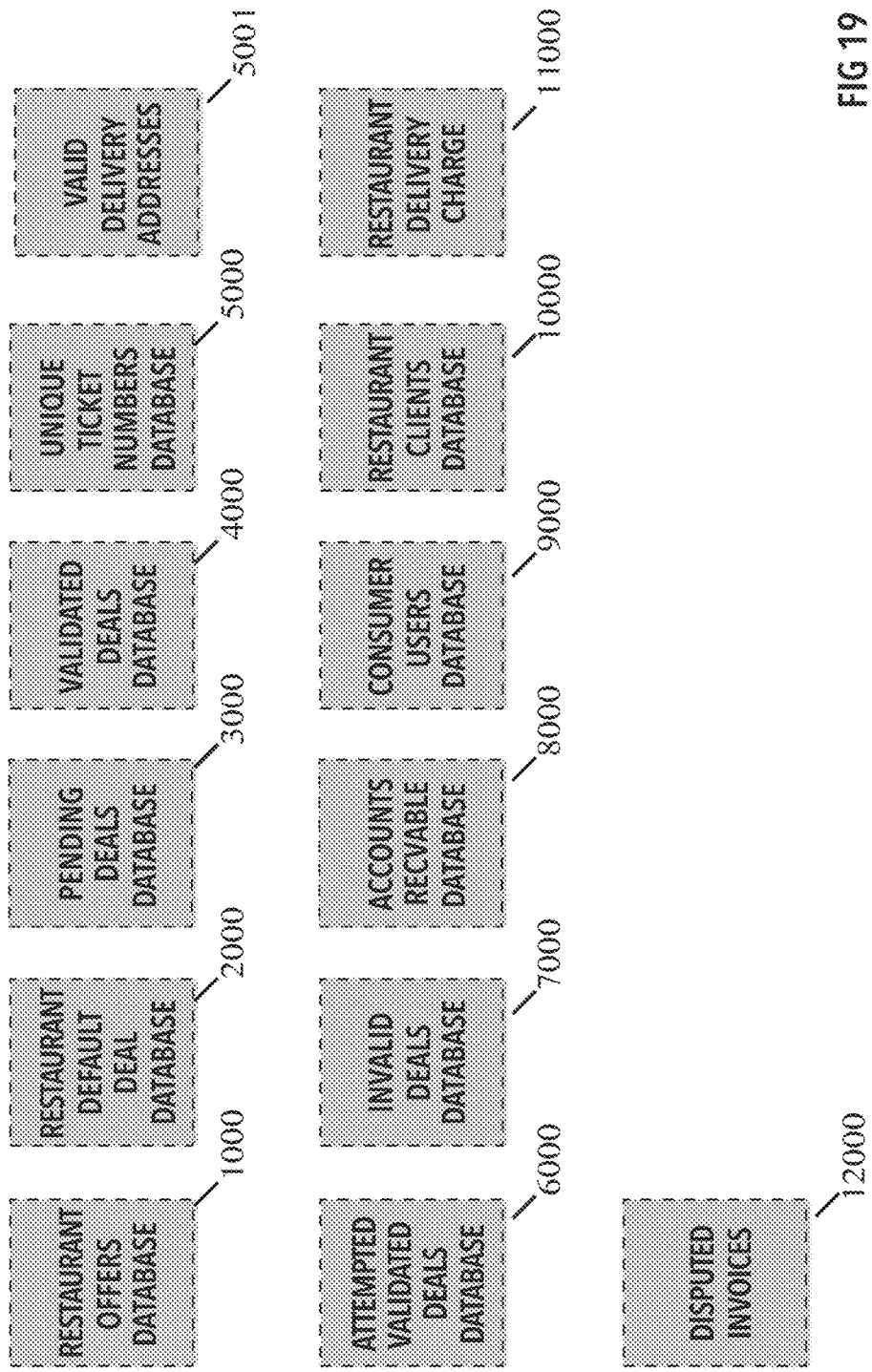
FIG. 19 illustrates the databases the System may use to execute this system and method.

Referring now to FIG. 19, here is illustrated the various databases utilized by the System such as the Restaurant Offers Database 1000, Restaurant Default Offers Database 2000, Pending Deals Database 3000, Validated Deals Database 4000, Unique Ticket Numbers Database 5000, Valid Delivery Database 5001, Attempted Validated Deals Database 6000, Invalid Deals Database 7000, Account Receivable Database 8000, Restaurant Consumers Database 9000, Restaurant Clients Database 10000, Restaurant Delivery Charge Database 11000 and Disputed Invoices 12000, and contain a CPU, memory, disk drive, operating System, network adapter (such as Ethernet) and other components typical of network servers, as well as a database application (such as those from Oracle).

With reference to FIG. 20, here are illustrated 3 sample bids from 3 different restaurants. For illustration purpose, the sample bids are in response to a consumer RFB in which the consumer indicated they would spend, minimally, $40.00 step 200, arrive at the restaurant between 7:00-8:00 PM step 201, and wishes to 'eat-in' step 202, the 'menu bonus' percentage the restaurant bids, (FIG. 11), the amount in dollars the menu bonus amount translates to, step 808, and the total deal value, step 811. The far-left column step 1800 is the name of the restaurant. Step 2101 displays the consumer had indicated they preferred, in this case, it's 'delivery'.

Figure 21:
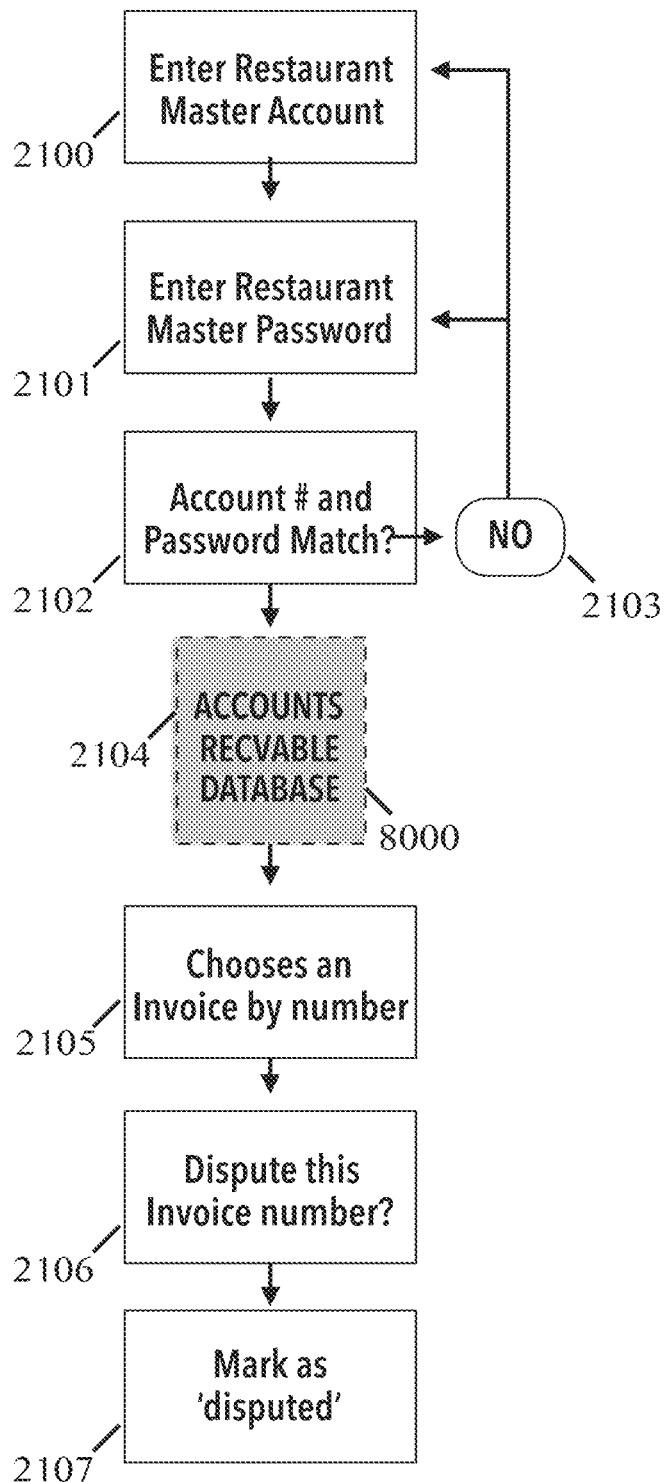
FIG. 21 demonstrates the steps an authorized restaurant representative would follow to dispute an invoice issued by the System.

With reference to FIG. 21, here is illustrated how an authorized restaurant representative may dispute an invoice that the System has created and indicated as being 'valid'. The authorized restaurant representative logs into the System with that restaurant's master account number, step 2100, then enters the restaurant's password, step 2101, and if the system determines step 2103 the master account number and password do not match, the Account Receivable Database 8000 may not be accessed, but if they do match step 2102 the Account Receivable Database 8000 may be accessed after which a specific invoice number step 2105 may be chosen by the authorized restaurant representative and then flagged step 2106 as disputed which the system will then flag as well and any system attempts to collect this invoice will be suspended temporarily step 2106

At least some aspects disclosed can be embodied, at least in part, in software. That is, the techniques may be carried out in a special purpose or general-purpose computer system or other data processing system in response to its processor, such as a microprocessor, executing sequences of instructions contained in a memory, such as ROM, volatile RAM, non-volatile memory, cache or a remote storage device. Functions expressed in the claims may be performed by a processor in combination with memory storing code and should not be interpreted as means-plus-function limitations.

Routines executed to implement the embodiments may be implemented as part of an operating system, firmware, ROM, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine-readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine-readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

In general, a machine-readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Thus, there has been disclosed above a system for exchanging dynamically priced offers that achieves substantial benefits over conventional electronic offer exchange systems, such as increased flexibility and faster processing times.

The above embodiments and preferences are illustrative of the present invention. It is neither necessary, nor intended for this patent to outline or define every possible combination or embodiment. The inventor has disclosed sufficient information to permit one skilled in the art to practice at least one embodiment of the invention. The above description and drawings are merely illustrative of the present invention and that changes in components, structure and procedure are possible without departing from the scope of the present invention as defined in the following claims. For example, elements and/or steps described above and/or in the following claims in a particular order may be practiced in a different order without departing from the invention. Thus, while the invention has been particularly shown and described with reference to embodiments thereof, it will be understood by those skilled in the art that various changes in form and details may be made therein without departing from the spirit and scope of the invention.

What is claimed is:

1. A consumer-restaurant data exchange system comprising:
   a) a data store having one or more databases comprising:
      i) a restaurant offers database;
      ii) pending deals database;
      iii) validated deals database;
      iv) a consumer users database; and,
      v) a restaurant clients database;
   b) a computer processor coupled to the data store and in communication through the Internet with a plurality of authorized restaurant representative computing devices and with a consumer user computing device, the computer processor being programmed, upon receiving respective indications from said devices, to:

i) receive identifying data from an authorized restaurant representative computing device and use the identifying data and the restaurant clients database to verify communications from the authorized restaurant representative's system computing device;

ii) serve data comprising content of an authorized restaurant representative's system dashboard to the authorized restaurant representative computing device via the Internet;

iii) receive offer data from the at least one authorized restaurant representative's system dashboard running on the authorized restaurant representative computing device, the offer data comprising data describing a minimum dollar amount, a time or range of time in which the offer will be valid, one or more restaurants in which the offer will be valid, and a customer discount associated with the offer;

iv) serve data comprising content of a prospective restaurant customer interface to the consumer user computing device via the Internet;

v) receive request-for-bid data from the consumer user computing device via the Internet, the request-for-bid data comprising data indicating a present or future geographic location of the prospective restaurant customer, an amount of money a consumer user guarantees to spend at a minimum if the user subsequently accepts an offer from a participating restaurant, a time or range of time at which the consumer user will promise to honor a deal, and a venue of the deal;

vi) use the request-for-bid data and a rules-based bid generator to search the restaurant offers database to identify one or more restaurant offers which meet criteria in the request-for-bid data;

vii) serve bid data comprising terms of said identified one or more restaurant offers to the consumer user via the prospective restaurant customer interface;

viii) receive from the consumer user via the prospective restaurant customer interface an indication of acceptance of an accepted offer;

ix) transform data in the pending deals database by storing an identification of the accepted offer, and storing a unique ticket number associated with the accepted offer;

x) receive an indication that the consumer user has honored required terms of the accepted offer; and, xi) transform data in the validated offers database by storing an indication that the accepted offer has been validated.

2. The consumer-restaurant data exchange system according to claim 1, wherein the consumer user computing device comprises a mobile device running an app and the prospective restaurant customer interface comprises an interface generated by the app running on the mobile device.

3. The consumer-restaurant data exchange system according to claim 2, wherein the mobile device comprises a smartphone.

4. The consumer-restaurant data exchange system according to claim 1, wherein the computer processor is further programmed to use the data indicating a present or future geographic location to identify potential offers by computing a geofence around the prospective restaurant customer's current or future location and identifying offers that are valid in restaurants within the geofence.

5. The consumer-restaurant data exchange system according to claim 1, wherein the data indicating a present or future geographic location comprises location data derived from GPS data in the consumer user computing device.

6. The consumer-restaurant data exchange system according to claim 1, wherein the offer data comprises a term requiring that the prospective restaurant customer either eat in, carry out, or receive delivery of, an order from the restaurant.

7. The consumer-restaurant data exchange system according to claim 1, wherein the authorized restaurant representative's system dashboard is configured to allow restaurant representatives to create rules-based dynamically-responsive offers where the consumer is offered a menu bonus credit, which is expressed as a percentage of whatever amount of money the consumer guarantees to first spend, at a minimum, before the that menu bonus credit is due the consumer.

8. The consumer-restaurant data exchange system according to claim 1, wherein the customer discount associated with the accepted offer comprises a percentage or dollar amount discount.

9. The consumer-restaurant data exchange system according to claim 1, wherein the offer data further comprises a term requiring that the prospective restaurant customer include a particular menu selection in the customer's order.

10. The consumer-restaurant data exchange system according to claim 1, wherein the data store further comprises a restaurant default offer database and the computer processor is further programmed to implement a restaurant registration process that requires an owner of a restaurant to create and agree to honor a default offer which is triggered when a consumer fails to honor all the elements of the default offer.

11. The consumer-restaurant data exchange system according to claim 1, wherein the authorized restaurant representative's system dashboard is configured to allow an authorized restaurant representative to choose a time of day, day of the week, and week of the year in which an offer can be valid.

12. The consumer-restaurant data exchange system according to claim 1, wherein the computer processor is further programmed to automatically declare a ticket as invalid after receiving an indication that a consumer arrived earlier or later than a window of time to which the consumer had originally obligated themselves in the accepted offer.

13. The consumer-restaurant data exchange system according to claim 1, wherein the computer processor is further programmed to automatically declare an offer as invalid after receiving an indication that a consumer arrived on a day different than a day to which the consumer had originally obligated themselves in the accepted offer.

14. The consumer-restaurant data exchange system according to claim 1, wherein the computer processor is further programmed to automatically declare a ticket number as invalid after receiving an indication that a consumer arrived at a restaurant location different than a restaurant location to which the consumer had originally obligated themselves in the accepted offer.

15. The consumer-restaurant data exchange system according to claim 1, wherein the computer processor is further programmed so as not to require the prospective restaurant customer to provide financial information of any kind to complete a transaction on the system.

16. The consumer-restaurant data exchange system according to claim 1, wherein the data store further comprises an attempted validated deals database and the computer processor is further programmed to record offer redemption attempts in the attempted validated deals database.

17. The consumer-restaurant data exchange system according to claim 1, wherein the authorized restaurant representative's system dashboard is configured to allow restaurant representatives to search for a ticket and to mark a corresponding invoice as disputed.

18. The consumer-restaurant data exchange system according to claim 17, wherein the computer processor is further programmed to quarantine the disputed invoice until a dispute is resolved.

19. The consumer-restaurant data exchange system according to claim 1, wherein the computer processor is further programmed to notify a restaurant of some, but not all, terms of the accepted offer.

20. The consumer-restaurant data exchange system according to claim 19, wherein the computer processor is further programmed to veil from the restaurant an amount of money prospective restaurant customer has agreed to spend.

21. The consumer-restaurant data exchange system according to claim 20, wherein the computer processor is further programmed to veil from the restaurant a bonus bid by the restaurant that was incorporated into the accepted offer.

22. The consumer-restaurant data exchange system according to claim 1, wherein the consumer user computing device comprises a computing device running a browser and the prospective restaurant customer interface comprises a page displayed in the browser.

23. The consumer-restaurant data exchange system according to claim 22, wherein the computer processor coupled to the data store comprises a processor of a web server.

* * * * *